(12) United States Patent
Tabata et al.

(10) Patent No.: US 7,238,133 B2
(45) Date of Patent: Jul. 3, 2007

(54) CONTROL APPARATUS FOR USE WITH DRIVING DEVICE OF VEHICLE

(75) Inventors: Atsushi Tabata, Okazaki (JP); Yutaka Taga, Aichi-gun (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 174 days.

(21) Appl. No.: 11/172,920

(22) Filed: Jul. 5, 2005

(65) Prior Publication Data

US 2006/0006734 A1  Jan. 12, 2006

(30) Foreign Application Priority Data

Jul. 9, 2004 (JP) ............................. 2004-203945

(51) Int. Cl.
*F16H 3/72* (2006.01)
(52) U.S. Cl. .......................................... 475/5
(58) Field of Classification Search ............... 475/5; 477/5; 180/197
See application file for complete search history.

(56) References Cited

U.S. PATENT DOCUMENTS 5,713,814 A * 2/1998 Hara et al. ...................... 477/5
6,655,485 B1 * 12/2003 Ito et al. ...................... 180/65.6

FOREIGN PATENT DOCUMENTS

| JP | 2000-002327 A | 1/2000 |
| JP | 2000-209706 A | 7/2000 |
| JP | 2000-346187 A | 12/2000 |
| JP | 2003-194209 A | 7/2003 |
| JP | 2004-236406 A | 8/2004 |

* cited by examiner

*Primary Examiner*—Dirk Wright
(74) *Attorney, Agent, or Firm*—Kenyon & Kenyon LLP

(57) ABSTRACT

A control apparatus for a vehicle's driving device including (A) a non-step speed change portion including (a1) a differential device that distributes an output of an engine to a first electric motor and a transmission member, and (a2) a second electric motor provided in a power transmission path from the transmission member to drive wheels, and (B) an automatic speed change portion constituting a portion of the power transmission path, the control apparatus including a vehicle behavior stabilization controller for stabilizing a behavior of the vehicle when the behavior of the vehicle is unstable; a coupling device which is selectively switchable to (a) a released state thereof in which the coupling device places the non-step speed change portion in a non-step speed change state thereof in which the non-step speed change portion is operable as an electric CVT (continuously variable transmission), and (b) an engaged state thereof in which the coupling device places the non-step speed change portion in a stepwise speed change state thereof in which the non-step speed change portion is not operable as the electric CVT; and a vehicle-stabilization-related switching controller which switches, when the vehicle behavior stabilization controller performs a vehicle behavior stabilization control, the coupling device to the released state thereof.

28 Claims, 12 Drawing Sheets

|  | C0 | C1 | C2 | B0 | B1 | B2 | B3 | SPEED RATIO | SPEED-RATIO STEP |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL STEP 4.76 |
| R |  |  | ○ |  |  |  | ○ | 3.209 | |
| N | ○ |  |  |  |  |  |  | | |

○ ENGAGED
◎ ENGAGED FOR STEPWISE CONTROL
   RELEASED FOR NON-STEP CONTROL

I ------ INPUT
O ------ OUTPUT

| | C0 | C1 | C2 | B0 | B1 | B2 | SPEED RATIO | SPEED-RATIO STEP |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | TOTAL STEP |
| R | | | ○ | | | ○ | 2.393 | |
| N | ○ | | | | | | | 3.977 |

○ ENGAGED
◎ ENGAGED FOR STEPWISE CONTROL
　RELEASED FOR NON-STEP CONTROL

I ----- INPUT
O ----- OUTPUT

CONTROL APPARATUS FOR USE WITH DRIVING DEVICE OF VEHICLE

The present application is based on Japanese Patent Application No. 2004-203945 filed on Jul. 9, 2004, the contents of which are incorporated herein by reference.

BACKGROUND OF THE INVENTION

1. Field of the Invention

The present invention relates to a driving device of a vehicle that includes a differential device having a differential function and thereby operating as a speed change device, i.e., a transmission, and particularly to the art of assuring that the driving device can employ, e.g., an electric motor having a small capacity.

2. Related Art Statement

There is known a driving device of a vehicle that includes a differential device that distributes an output of an engine to a first electric motor and an output shaft; and a second electric motor that is provided between the output shaft of the differential device, and drive wheels of the vehicle. An example of a driving device of a hybrid vehicle is disclosed by each of Japanese Patent Application Publication No. 2000-2327 and Japanese Patent Application Publication No. 2000-346187. In the hybrid-vehicle driving device, the differential device is constituted by, e.g., a planetary gear set, and it mechanically transmits, owing to a differential function of the planetary gear set, a main portion of driving power of the engine to the drive wheels, and electrically transmits the remaining portion of the power via an electric path from the first electric motor to the second electric motor. Thus, the differential device functions as a transmission whose speed ratio is electrically changeable, for example, an electric CVT (continuously variable transmission). The differential device is controlled by a control device so that the vehicle can run while the engine is kept in an optimum operating state. Thus, a fuel consumption rate of the vehicle is improved.

Meanwhile, usually, a vehicle can stably turn in response to driver's operation of a steering member such as a steering wheel. However, depending upon a running condition such as running on a road surface having a low frictional resistance, running at a high speed, or turning at a high speed, or an external cause, a behavior of the vehicle may become unstable when the vehicle is turning. The unstable behavior of the vehicle is, for example, a state in which rear wheels of the vehicle lose more grip of road surface than front wheels thereof and accordingly the rear wheels tend to slip in a lateral direction thereof, or a state in which the front wheels lose more grip of road surface than the rear wheels and accordingly the front wheels tend to slip in the lateral direction. When the rear wheels tend to slip in the lateral direction, so-called "over-steering" tends to occur, that is, the vehicle tends to turn by an angle excessively greater than an angle corresponding to an amount of driver's operation of the steering member. When the front wheels tend to slip in the lateral direction, so-called "under-steering" tends to occur, that is, the vehicle tends to turn by an angle excessively smaller than the angle corresponding to the amount of operation of the steering member.

There is known a control device of a vehicle that employs a vehicle behavior stabilization control means or device that stabilizes a behavior of the vehicle by controlling, when the behavior of the vehicle becomes unstable, an output torque of a driving-power source (i.e., a driving-power-source torque) or a braking force applied to each drive wheel, and thereby controlling a torque of the each drive wheel. An example of the vehicle control device is disclosed by Japanese Patent Application Publication No. 2003-194209. The disclosed vehicle control device employs, as the vehicle behavior stabilization control means, a device that is called "VSC (vehicle stability control) system" and stabilizes a behavior of the vehicle when the vehicle is turning. If over-steering or under-steering tends to occur when the vehicle is turning, the VSC system stabilizes the vehicle by lowering an output torque of an engine (i.e., an engine torque) and applying a braking force to front and/or rear wheels, thereby producing a rear-wheel-lateral-slip restraining moment or a front-wheel-lateral-slip restraining moment.

As a different sort of vehicle behavior stabilization control means than the VSC system, there is well known a device that is called "ABS (antilock brake system)". When a vehicle is braked, the ABS appropriately controls a braking force applied to a drive wheel or wheels, so as to prevent locking of the drive wheel or wheels and thereby assure that the vehicle can enjoy an excellent braking performance and thereby maintain high stability and steerability.

SUMMARY OF THE INVENTION

Generally, a CVT (continuously variable transmission) is known as a device that improves a fuel consumption rate of a vehicle, and a gear type transmission such as a stepwise variable automatic transmission is known as a device that exhibits a high transmission efficiency. However, there have been no power transmission devices that have the respective advantages of the CVT and the gear type transmission. For example, since the hybrid-vehicle driving device disclosed by the above-indicated Japanese Patent Application Publication No. 2000-2327 employs the electric path in which the electric power is transmitted from the first electric motor to the second electric motor, that is, a transmission path in which a portion of the driving power of the vehicle is transmitted as the electric power, the driving device needs to employ, as the first electric motor, an electric motor having a large capacity, when the vehicle employs a high-powered engine. In addition, since the second electric motor is driven by the electric power outputted from the first electric motor, the driving device needs to employ, as the second electric motor, an electric motor having a large capacity, and accordingly the driving device as a whole cannot help occupying a large space. Moreover, since a portion of the output of the engine is converted, once, into the electric power and then is supplied to the drive wheels, the fuel consumption rate of the vehicle may be lowered depending upon a running condition of the vehicle such as running at a high speed. This problem also occurs to the case where the above-described differential device (e.g., a power transfer) is used as a transmission whose speed ratio is electrically changeable, for example, a CVT, i.e., so-called "electric CVT".

In addition, generally, when a behavior of a vehicle becomes unstable and a vehicle behavior stabilization control means such as VSC system or ABS performs a control operation to stabilize the behavior of the vehicle, it is desirable to improve a control performance of the vehicle behavior stabilization control means. That is, it is desirable to employ a control device that can improve the performance of the stabilization control means. This is also the case with the above-described vehicle driving device that is free of the above-identified problem of the hybrid-vehicle driving device.

It is therefore an object of the present invention to provide a driving device of a vehicle that can enjoy a small size of its own or can improve a fuel consumption rate of the vehicle, and/or a control apparatus that includes a vehicle behavior stabilization controller for stabilizing, when a behavior of the vehicle is unstable, the unstable behavior of the vehicle, and improves a control performance of the vehicle behavior stabilization controller when the stabilization controller controls or stabilizes the behavior of the vehicle.

The Inventors have carried out extensive studies to achieve the above-indicated object, and found that the first and second electric motors need not have so large a capacity, or produce so large an output, if the vehicle runs in a service engine output range in which the engine output is considerably small, but need to have or produce a large capacity or output if the vehicle runs in a high engine output range, e.g., in a maximum engine output range, for example, if the vehicle runs at a high engine output, and therefore that if, in the high engine output range, the engine output is transmitted to the drive wheels exclusively via a mechanical, power transmission path, the first and second electric motors can have a small capacity and accordingly the driving device of the vehicle can be provided in a small space. In addition, the Inventors have found that if, when the vehicle runs at a high speed, the engine output is likewise transmitted to the drive wheels exclusively via the mechanical power transmission path, the electric path in which a portion of the output of the engine is once converted by the first electric motor into the electric power and then the driving power is transmitted by the second electric motor to the drive wheels is not established, and accordingly the conversion loss between the driving power and the electric power can be effectively reduced, so that the fuel consumption rate of the vehicle is further improved. The present invention has been developed based on these findings.

(1) According to a first feature of the present invention, there is provided a control apparatus for use with a driving device of a vehicle, the driving device including (A) a non-step speed change portion which includes (a1) a differential device that distributes an output of an engine to a first electric motor and a transmission member, and (a2) a second electric motor that is provided in a power transmission path from the transmission member to a plurality of drive wheels, and which is operable as an electric, continuously variable transmission, and (B) an automatic speed change portion which constitutes a portion of the power transmission path and functions as an automatic transmission, the control apparatus comprising a vehicle behavior stabilization controller which is for stabilizing a behavior of the vehicle when the behavior of the vehicle is unstable; a coupling device which is selectively switchable to (a) a released state thereof in which the coupling device places the non-step speed change portion in a non-step speed change state thereof in which the non-step speed change portion is operable as the electric continuously variable transmission, and (b) an engaged state thereof in which the coupling device places the non-step speed change portion in a stepwise speed change state thereof in which the non-step speed change portion is not operable as the electric continuously variable transmission; and a vehicle-stabilization-related switching controller which switches, when the vehicle behavior stabilization controller performs a vehicle behavior stabilization control, the coupling device to the released state thereof. In the released state of the coupling device, the coupling device may allow the rotary elements of the differential device to be rotated relative to each other and thereby place the non-step speed change portion in the non-step speed change state thereof and, in the engaged state of the coupling device, the coupling device may relatively bind the rotary elements of the differential device to each other, or absolutely bind one of the rotary elements of the differential device, and thereby place the non-step speed change portion in the stepwise speed change state thereof.

In the control apparatus in accordance with the first feature of the present invention, the coupling device selectively switches the non-step speed change portion of the driving device of the vehicle, to the non-step speed change state thereof in which the non-step speed change portion is operable as the electric CVT (continuously variable transmission) or to the stepwise speed change state thereof in which the non-step speed change portion is not operable as the electric CVT. Therefore, the driving device can enjoy the two advantages, i.e., the fuel consumption rate improving effect of the transmission whose speed ratio is electrically changeable and the high transmission efficiency of the gear type transmission that mechanically transmits the driving power. For example, in a cruising or service engine output range in which the vehicle runs at a low or intermediate speed or at a low or intermediate output, the non-step speed change portion is switched to the non-step speed change state thereof so that a high fuel consumption rate of the vehicle is obtained; and, when the vehicle runs at a high speed, the non-step speed change portion is switched to the stepwise speed change state thereof in which the output of the engine is transmitted to the drive wheels exclusively via the mechanical, power transmission path and accordingly the conversion loss between the driving power and the electric energy that would be produced when the non-step speed change portion is operated as the transmission whose speed ratio is electrically changeable is effectively restrained, so that the fuel consumption rate of the vehicle is improved. In addition, when the vehicle runs at a high output, the non-step speed change portion is switched to the stepwise speed change state thereof. Thus, the non-step speed change portion is operated as the transmission whose speed ratio is electrically changeable, only in the range in which the vehicle runs at the low or intermediate speed or at the low or intermediate output. Therefore, a maximum value of the electric energy to be produced by the electric motors, in other words, the electric energy to be transmitted by the electric motors can be decreased, and accordingly those electric motors, or the vehicle's driving device including the electric motors can be reduced with respect to their capacity.

In addition, in the driving device including the non-step speed change portion that is selectively switchable to the non-step speed change state thereof or to the stepwise speed change state thereof, the coupling device is switched to the released state thereof by the vehicle-stabilization-related switching controller, when the vehicle behavior stabilization controller performs the control operation to stabilize the behavior of the vehicle. Thus, since the engine and the drive wheels are released from the state in which they are mechanically connected to each other, that is, since the engine can be rotated freely relative to the drive wheels, the torque of each drive wheel can be controlled with an improved degree of freedom and accordingly the control performance of the vehicle behavior stabilization controller to control or stabilize the behavior of the vehicle can be improved.

(2) According to a second feature of the present invention, there is provided a control apparatus for use with a driving device of a vehicle, the driving device including a power transmission device which includes (a1) a differential device that distributes an output of an engine to a first electric motor and a transmission member, and (a2) a second electric motor that is provided in a power transmission path from the transmission member to a plurality of drive wheels, and which is operable as an electric differential system, the control apparatus comprising a vehicle behavior stabilization controller which is for stabilizing a behavior of the vehicle when the behavior of the vehicle is unstable; a coupling device which is associated with the differential device and which is for selectively switching the differential device to (a) a differential state thereof in which the differential device exhibits a differential function and to (b) a locked state thereof in which the differential device does not exhibit the differential function; and a vehicle-stabilization-related switching controller which operates, when the vehicle behavior stabilization controller performs a vehicle behavior stabilization control, the coupling device to switch the differential device to the differential state thereof.

In the control apparatus in accordance with the second feature of the present invention, the coupling device selectively switches the differential device of the driving device of the vehicle, to the differential state thereof in which the differential device exhibits the differential function, or to the locked state thereof in which the differential device does not exhibit the differential function. Therefore, the driving device can enjoy the two advantages, i.e., the fuel consumption rate improving effect of the transmission whose speed ratio is electrically changeable and the high transmission efficiency of the gear type transmission that mechanically transmits the driving power. For example, in a cruising or service engine output range in which the vehicle runs at a low or intermediate speed or at a low or intermediate output, the differential device is switched to the differential state thereof so that a high fuel consumption rate of the vehicle is obtained; and, when the vehicle runs at a high speed, the differential device is switched to the locked state thereof in which the output of the engine is transmitted to the drive wheels exclusively via the mechanical, power transmission path and accordingly the conversion loss between the driving power and the electric energy that would be produced when the differential device is operated as the transmission whose speed ratio is electrically changeable is effectively reduced, so that the fuel consumption rate of the vehicle is improved. In addition, when the vehicle runs at a high output, the differential device is switched to the locked state thereof. Thus, the differential device is operated as the transmission whose speed ratio is electrically changeable, only in the range in which the vehicle runs at the low or intermediate speed or at the low or intermediate output. Therefore, a maximum value of the electric energy to be produced by the electric motors, in other words, the electric energy to be transmitted by the electric motors can be decreased, and accordingly those electric motors, or the vehicle's driving device including the electric motors can be reduced with respect to their capacity.

In addition, in the driving device including the differential device that is selectively switchable to the differential state thereof or to the locked state thereof, the differential device is switched to the differential state thereof by the vehicle-stabilization-related switching controller, when the vehicle behavior stabilization controller performs the control operation to stabilize the behavior of the vehicle. Thus, since the engine and the drive wheels are released from the state in which they are mechanically connected to each other, that is, since the engine can be rotated freely relative to the drive wheels, the torque of each drive wheel can be controlled with an improved degree of freedom and accordingly the control performance of the vehicle behavior stabilization controller to control or stabilize the behavior of the vehicle can be improved.

(3) According to a third feature of the present invention that may be combined with the first feature (1), the non-step speed change portion is placed in the non-step speed change state thereof when the differential device is switched by the coupling device to a differential state thereof in which the differential device exhibits a differential function, and the non-step speed change portion is placed in the stepwise speed change state thereof when the differential device is switched by the coupling device to a locked state thereof in which the differential device does not exhibit the differential function. Thus, the non-step speed change portion can be easily switched to the non-step speed change state thereof or to the stepwise speed change state thereof.

(4) According to a fourth feature of the present invention that may be combined with the second or third feature (2) or (3), the differential device includes a first element connected to the engine, a second element connected to the first electric motor, and a third element connected to the transmission member. The coupling device may switch the differential device to the differential state thereof, by allowing the first, second, and third elements to be rotated relative to each other, and switch the differential device to the locked state thereof, by allowing the first, second, and third elements to be rotated as an integral unit, or inhibiting the second element from being rotated. Thus, the differential device can be easily switched to the differential state thereof or to the locked state thereof.

(5) According to a fifth feature of the present invention that may be combined with the fourth feature (4), the coupling device comprises at least one of (a) a clutch which selectively connects at least two elements of the first, second, and third elements, to each other, so that the first, second, and third elements are rotated as the integral unit, and (b) a brake which selectively connects the second element to a non-rotary element so that the second element is inhibited from being rotated. Thus, the differential device can be easily switched to the differential state thereof or to the locked state thereof.

(6) According to a sixth feature of the present invention that may be combined with the fifth feature (5), the differential device is switched, when the clutch and the brake is released, to the differential state thereof in which the first, second, and third elements are rotated relative to each other. When the clutch is engaged and the brake is released, the differential device may be switched to the locked state thereof in which the differential device operates as a transmission whose speed ratio is equal to 1, and/or when the brake is engaged and the clutch is released, the differential device may be switched to the locked state thereof in which the differential device operates as a speed increase transmission whose speed ratio is smaller than 1. Thus, the differential device can be easily switched to the differential state thereof or to the locked state thereof, and can be operated as a single-step or plural-step transmission having a single constant speed ratio or a plurality of constant speed ratios.

(7) According to a seventh feature of the present invention that may be combined with any of the fourth to sixth features (4) through (6), the differential device comprises a planetary gear set including a carrier, a sun gear, and a ring gear, and the first, second, and third elements of the differential device comprise the carrier, the sun gear, and the ring gear, respectively. Thus, a dimension of the differential device in an axial direction thereof can be decreased. In addition, the differential device can be simply constituted by the single planetary gear set.

(8) According to an eighth feature of the present invention that may be combined with the seventh feature (7), the planetary gear set comprises a single-pinion planetary gear set including a pinion. Thus, the dimension of the differential device in the axial direction thereof can be decreased. In addition, the differential device can be simply constituted by the single single-pinion planetary gear set.

(9) According to a ninth feature of the present invention that may be combined with any of the first and third to eighth features (1) and (3) through (8), a total speed ratio of the driving device is defined by a speed ratio of the automatic speed change portion and a speed ratio of the non-step speed change portion. Since the driving power can be changed in a wide range by utilizing the speed ratios of the automatic speed change portion, the non-step speed change portion can be operated, with a high efficiency, as the electric CVT.

(10) According to a tenth feature of the present invention that may be combined with any of the second and fourth to eighth features (2) and (4) through (8), the control apparatus further comprises an automatic speed change portion which constitutes a portion of the power transmission path, wherein a total speed ratio of the driving device is defined by a speed ratio of the automatic speed change portion and a speed ratio of the differential device. Since the driving power can be changed in a wide range by utilizing the speed ratios of the automatic speed change portion, the differential device can be operated, with a high efficiency, as the electric differential system.

(11) According to an eleventh feature of the present invention that may be combined with any of the first and third to tenth features (1) and (3) through (10), the automatic speed change portion comprises a stepwise automatic transmission. Thus, in the non-step speed change state of the non-step speed change portion, or in the differential state of the differential device, the non-step speed change portion or the differential device cooperates with the stepwise automatic transmission to constitute a CVT; and in the stepwise speed change state of the non-step speed change portion or in the locked state of the differential device, the non-step speed change portion or the differential device cooperates with the stepwise automatic transmission to constitute a stepwise variable transmission.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Hereinafter, there will be described in detail preferred embodiments of the present invention by reference to the drawings.

<First Embodiment>

Figures 1, 2:
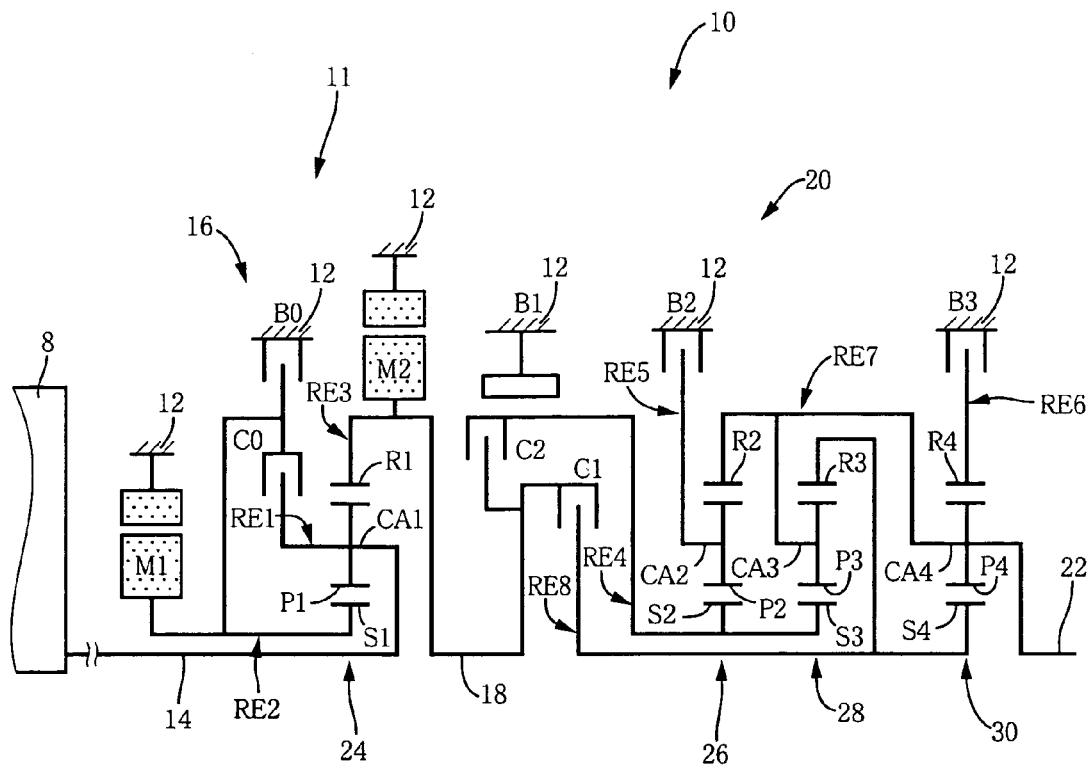
FIG. 1 is a schematic view for explaining a construction of a transmission system as a portion of a driving device of a hybrid vehicle to which the present invention is applied.
FIG. 2 is an operation table representing a relationship between non-step or stepwise speed change operations of the transmission system, and combinations of respective operating states of hydraulically operated frictional coupling devices that are used to perform those speed change operations, respectively.

FIG. 1 is a schematic view for explaining a transmission system 10 constituting a portion of a driving device of a so-called "hybrid" automotive vehicle to which the present invention is applied. The hybrid vehicle additionally includes an electronic control device 40 shown in FIG. 4. In FIG. 1, the transmission system 10 includes an input shaft 14 as a rotary input member, a non-step (i.e., continuous) speed change portion 11 as a power transmission device, an automatic speed change portion 20 as a stepwise automatic transmission, and an output shaft 22 as a rotary output member all of which are provided, in series, on a common axis in a transmission case 12 (hereinafter referred to as the "case 12") as a non-rotary (i.e., stationary) member that is fixed to a body of the vehicle. The non-step speed change portion 11 is connected to the input shaft 14 directly, but it may be connected indirectly via, e.g., a pulsation absorbing damper (i.e., a vibration damping device), not shown. The automatic speed change portion 20 is connected, in series, to the non-step speed change portion 11 via a transmission member 18 (e.g., a transmission shaft), in a power transmission path between the non-step speed change portion 11 and a pair of drive wheels 38 (FIG. 5) of the vehicle. The output shaft 22 is connected to the automatic speed change portion 20. The transmission system 10 is preferably employed by an FR (front engine, rear drive) vehicle in which the system 10 is provided along a longitudinal axis of the vehicle. More specifically described, the transmission system 10 is provided between an internal combustion engine (E/G) 8 (hereinafter, referred to as the engine 8) such as a gasoline engine or a diesel engine, and the two drive wheels 38. The engine 8 functions as a driving power source that produces a driving power to drive or run the vehicle, and is connected to the input shaft 14 either directly, or indirectly via, e.g., the pulsation absorbing damper, not shown. As shown in FIG. 5, the transmission system 10 transmits the driving power produced by the engine 8, to the two drive wheels 38 via, first, a differential gear unit (e.g., a final reduction gear) 36 and, then, two axle shafts. The differential gear unit 36 constitutes another portion of the driving device, and is provided in the power transmission path. Since the transmission system 10 has a symmetrical construction with respect to the above-indicated common axis, a lower half portion of the system 10 is not shown in FIG. 1. This applies to another transmission system 70 as a second embodiment, shown in FIG. 11. In the present transmission system 10 as a first embodiment, the non-step speed change portion 11 is "directly coupled" to the engine 8. The phrase "directly coupled" means that the non-step speed change portion 11 is connected to the engine 8 in such a manner that a hydraulic power transmission such as a torque converter or a fluid coupling is not provided between the two elements 11, 8, and accordingly the phrase "directly coupled" encompasses the above-indicated case where the two elements 11, 8 are connected to each other via, e.g., the pulsation absorbing damper.

The non-step speed change portion 11 includes a first electric motor M1, a power transfer 16 as a differential device, and a second electric motor M2. The power transfer 16 is a mechanical device that mechanically distributes the driving power of the engine 8 outputted to the input shaft 14, more specifically described, mechanically distributes the output of the engine 8 to the first motor M1 and the transmission member 18. The second motor M2 is rotated integrally with the transmission member 18. The second motor M2 may be provided anywhere in a portion of the power transmission path that is located between the transmission member 18 and the drive wheels 38. Though each of the first and second motors M1, M2 is a so-called "motor generator" that has the function of generating electric power, the first motor M1 functions as at least a generator that produces a reaction force, and the second motor M2 functions as at least a motor as a driving power source that produces a driving power to drive or run the vehicle.

The power transfer 16 is essentially constituted by a single-pinion first planetary gear set 24 having a pre-determined gear ratio $\rho 1$, e.g., about 0.418; a switching clutch C0; and a switching brake B0. The first planetary gear set 24 includes, as a plurality of rotary elements thereof (i.e., a plurality of elements thereof), a first sun gear S1; a first planetary gear P1; a first carrier CA1 supporting the first planetary gear P1 such that the planetary gear P1 can be rotated and revolved; and a first ring gear R1 engaging the first sun gear S1 via the first planetary gear P1. Providing that a number of teeth of the first sun gear S1 is expressed as ZS1 and a number of teeth of the first ring gear R1 is expressed as ZR1, the above-indicated gear ratio $\rho 1$ of the first planetary gear set 24 is expressed as $\rho 1 = ZS1/ZR1$.

The power transfer 16 is constructed such that the first carrier CA1 is connected to the input shaft 14 and accordingly the engine 8; the first sun gear S1 is connected to the first motor M1; and the first ring gear R1 is connected to the transmission member 18. In addition, the switching brake B0 is provided between the first sun gear S1 and the case 12, and the switching clutch C0 is provided between the first sun gear S1 and the first carrier CA1. In a state in which the clutch C0 and the brake B0 are both disengaged (i.e., released), the power transfer 16 is switched to a differential state thereof. That is, in the state in which the clutch C0 and the brake B0 are both disengaged, the first sun gear S1, the first carrier CA1 and the first ring gear R1 as the three elements of the first planetary gear set 24 can be rotated relative to each other, so that the power transfer 16 is switched to its differential state in which the power transfer 16 exhibits a differential function, i.e., operates as the differential device and accordingly the output of the engine 8 is distributed to the first motor M1 and the transmission member 18. More specifically described, a portion of the output of the engine 8 is stored as electric energy produced by the first motor M1, and another portion of the output of the engine 8 is used to rotate the second motor M2, so that the non-step speed change portion 11 (or the power transfer 16) operates as an electric differential system, e.g., the portion 11 is switched to a so-called "non-step speed change state" in which the portion 11 operates as an electric CVT (continuously variable transmission). Thus, when the engine 8 is rotated at a constant speed, a speed of rotation of the transmission member 18 is continuously changed. That is, when the power transfer 16 is switched to the differential state thereof, the non-step speed change portion 11 is also switched to a differential state thereof, that is, switched to the non-step speed change state thereof in which the portion 11 operates as the electric CVT and accordingly a speed ratio (i.e., a transmission gear ratio) $\gamma 0$ of the portion 11 can be continuously changed between a minimum value $\gamma 0_{min}$ and a maximum value $\gamma 0_{max}$. The speed ratio $\gamma 0$ of the non-step speed change portion 11 is defined as a value obtained by dividing the rotation speed of the input shaft 14 by the rotation speed of the transmission member 18.

In the above-indicated non-step speed change state, if either the switching clutch C0 or the switching brake B0 is engaged, then the power transfer 16 is switched to a non-differential state thereof in which the power transfer 16 cannot operate as the differential device, i.e., does not exhibit a differential function. More specifically described, in a state in which the switching clutch C0 is engaged (but the switching brake B0 remains disengaged) and accordingly the first sun gear S1 and the first carrier CA1 are integrally engaged with each other, the first sun gear S1, the first carrier CA1, and the first ring gear R1 as the three elements of the first planetary gear set 24 are placed in a locked state in which the three elements are relatively bounded to each other, and are rotated as an integral unit, so that the power transfer 16 is switched to the non-differential state in which the power transfer 16 cannot operate as the differential device. Accordingly, the non-step speed change portion 11 is also switched to the non-differential state thereof. Since, in the non-differential state, the respective rotation speeds of the engine 8 and the transmission member 18 are equal to each other, the non-step speed change portion 11 (or the power transfer 16) is switched to a constant speed change state thereof, i.e., a stepwise speed change state thereof in which the portion 11 operates as a transmission whose speed ratio γ0 is fixed at 1. Alternatively, if the switching brake B0 is engaged (but the switching clutch C0 is disengaged) and accordingly the first sun gear S1 is connected to the case 12, the power transfer 16 is switched to a different locked state in which the first sun gear S1 is absolutely bounded to the case 12 and cannot be rotated, so that the power transfer 16 is switched to the non-differential state in which the power transfer 16 cannot operate as the differential device. Accordingly, the non-step speed change portion 11 is also switched to the non-differential state thereof. Since, in the latter non-differential state, the first ring gear R1 is rotated at a speed higher than that of the first carrier CA1, the power transfer 16 operates as a speed increase device. The non-step speed change portion 11 is switched to a different constant speed change state thereof, i.e., a different stepwise speed change state thereof in which the portion 11 operates as a speed increase transmission whose speed ratio γ0 is fixed at a value smaller than 1, e.g., a value equal to about 0.7. Thus, in the present embodiment, when each of the switching clutch C0 and the switching brake B0 is selectively switched to the released state thereof or the engaged state thereof, the each coupling device C0, B0 operates as a state switching device that selectively switches the non-step speed change portion 11 (or the power transfer 16) to the differential state thereof or the non-differential state thereof, e.g., to the non-step speed change state thereof (the differential state thereof) in which the portion 11 (or the transfer 16) operates as the electric differential system, e.g., exhibits an electric CVT function, or operates as the electric CVT in which the speed ratio γ0 of the portion 11 can be electrically continuously changed, or to the locked state thereof in which the portion 11 does not exhibit the electric CVT function, or does not operate as the electric CVT, i.e., in which the speed ratio γ0 of the portion 11 is fixed at a certain value, in other words, the constant speed change state thereof (the non-differential state thereof) in which the portion 11 operates as a single-step or plural-step transmission having one or more constant or fixed speed ratios.

The automatic speed change portion 20 includes a single-pinion second planetary gear set 26, a single-pinion third planetary gear set 28, and a single-pinion fourth planetary gear set 30. The second planetary gear set 26 includes a second sun gear S2; a second planetary gear P2; a second carrier CA2 supporting the second planetary gear P2 such that the planetary gear P2 can be rotated and revolved; and a second ring gear R2 engaging the second sun gear S2 via the second planetary gear P2. The second planetary gear set 26 has a pre-determined gear ratio ρ2, e.g., about 0.562. The third planetary gear set 28 includes a third sun gear S3; a third planetary gear P3; a third carrier CA3 supporting the third planetary gear P3 such that the planetary gear P3 can be rotated and revolved; and a third ring gear R3 engaging the third sun gear S3 via the third planetary gear P3. The third planetary gear set 28 has a pre-determined gear ratio ρ3, e.g., about 0.425. The fourth planetary gear set 30 includes a fourth sun gear S4; a fourth planetary gear P4; a fourth carrier CA4 supporting the fourth planetary gear P4 such that the planetary gear P4 can be rotated and revolved; and a fourth ring gear R4 engaging the fourth sun gear S4 via the fourth planetary gear P4. The fourth planetary gear set 30 has a pre-determined gear ratio ρ4, e.g., about 0.421. Providing that respective teeth numbers of the second sun gear S2, the second ring gear R2, the third sun gear S3, the third ring gear R3, the fourth sun gear S4, and the fourth ring gear R4 are expressed as ZS2, ZR2, ZS3, ZR3, ZS4, and ZR4, respectively, the above-indicated gear ratios ρ2, ρ3, ρ4 are defined as ρ2=ZS2/ZR2, ρ3=ZS3/ZR3, and ρ4=ZS4/ZR4, respectively.

In the automatic speed change portion 20, the second and third sun gears S2, S3 are integrally connected to each other, are selectively connectable to the transmission member 18 via a second clutch C2, and are selectively connectable to the case 12 via a first brake B1; the second carrier CA2 is selectively connectable to the case 12 via a second brake B2; the fourth ring gear R4 is selectively connectable to the case 12 via a third brake B3; the second ring gear R2, the third carrier CA3 and the fourth carrier CA4 are integrally connected to each other, and are connected to the output shaft 22; and the third ring gear R3 and the fourth sun gear S4 are integrally connected to each other, and are selectively connectable to the transmission member 18 via a first clutch C1. Thus, the automatic speed change portion 20 and the transmission member 18 are selectively connectable to each other via the first clutch C1 or the second clutch C2 that is used to establish an appropriate one of the speed steps of the automatic speed change portion 20. In other words, each of the first clutch C1 and the second clutch C2 operates as a coupling device which selectively switches the power transmission path between the transmission member 18 and the automatic speed change portion 20, stated differently, the power transmission path between the non-step speed change portion 11 (the transmission member 18) and the drive wheels 38, to a power transmission allowing state thereof in which the power is allowed to be transmitted, and to a power transmission inhibiting state thereof in which the power is inhibited from being transmitted. That is, when at least one of the first clutch C1 and the second clutch C2 is engaged, the power transmission path is switched to the power transmission allowing state thereof and, when both the first clutch C1 and the second clutch C2 are released, the power transmission path is switched to the power transmission inhibiting state thereof.

Each of the above-described switching clutch C0, first clutch C1, second clutch C2, switching brake B0, first brake B1, second brake B2, and third brake B3 is a hydraulically operated frictional coupling device that is commonly used in conventional vehicle's automatic transmissions, and may be of a plate type in which a plurality of friction plates stacked on each other are pressed by a hydraulic actuator, or of a band type in which one end, or respective one ends, of one or two bands wound around an outer circumferential surface of a rotary drum is or are tightened by a hydraulic actuator. Each of the frictional coupling devices is for selectively connecting two members, between which the each coupling device is provided, to each other.

In the transmission system 10 constructed as described above, the switching clutch C0, the first clutch C1, the second clutch C2, the switching brake B0, the first brake B1, the second brake B2, and the third brake B3 are selectively engaged or disengaged, as indicated in an operation table shown in FIG. 2, so as to establish selectively one of a first speed step ($1^{st}$), a second speed step ($2^{nd}$), a third speed step ($3^{rd}$), a fourth speed step ($4^{th}$), a fifth speed step ($5^{th}$), a reverse speed step (R), and a neutral position (N). Respective speed ratios γ of the first to fifth speed steps $1^{st}$ through $5^{th}$ change with a substantially same ratio. Each speed ratio γ is defined as being equal to (rotation speed $N_{IN}$ of input shaft 14)/(rotation speed $N_{OUT}$ of output shaft 22). In the operation table of FIG. 2, symbol "◯" indicates an engaged state of each clutch C0, C1, C2 or each brake B1, B2, B3; and symbol "⊙" indicates an engaged state of the switching clutch or brake C0, B0 when the non-step speed change portion 11 operates in the constant speed change state, and a disengaged (i.e., released) state of the same C0, B0 when the non-step speed change portion 11 operates as the electric CVT. In the present embodiment, the power transfer 16 employs the switching clutch C0 and the switching brake B0 and, when either the switching clutch C0 or the switching brake B0 is engaged, the non-step speed change portion 11 can take the constant speed change state in which the portion 11 operates as the transmission whose speed ratio γ0 is fixed, in addition to the non-step speed change state in which the portion 11 operates as the electric CVT. Therefore, when either the switching clutch C0 or the switching brake B0 is engaged, the transmission system 10 can take a stepwise speed change state in which the non-step speed change portion 11, placed in the constant speed change state, cooperates with the automatic speed change portion 20 to operate as a stepwise variable transmission; and when neither the switching clutch C0 nor the switching brake B0 is engaged, the transmission system 10 can take a non-step (i.e., continuous) speed change state in which the non-step speed change portion 11, placed in the non-step speed change state, cooperates with the automatic speed change portion 20 to operate as an electric CVT. In short, when either the switching clutch C0 or the switching brake B0 is engaged, the transmission system 10 is switched to the stepwise speed change state; and when neither the switching clutch C0 nor the switching brake B0 is engaged, the transmission system 10 is switched to the non-step speed change state. In addition, it can be said that like the transmission system 10, the non-step speed change portion 11 is a transmission that can be selectively switched to the stepwise speed change state and the non-step speed change state.

For example, when the transmission system 10 operates as the stepwise variable transmission and simultaneously when the switching clutch C0, the first clutch C1 and the third brake B3 are engaged as shown in FIG. 2, the first speed step $1^{st}$ is established in which a maximum value of a speed ratio γ1 thereof is equal to, e.g., about 3.357; when the switching clutch C0, the first clutch C1 and the second brake B2 are engaged, the second speed step $2^{nd}$ is established in which a speed ratio γ2 thereof is smaller than the speed ratio γ1 and is equal to, e.g., about 2.180; when the switching clutch C0, the first clutch C1 and the first brake B1 are engaged, the third speed step $3^{rd}$ is established in which a speed ratio γ3 thereof is smaller than the speed ratio γ2 and is equal to, e.g., about 1.424; when the switching clutch C0, the first clutch C1 and the second clutch C2 are engaged, the fourth speed step $4^{th}$ is established in which a speed ratio γ4 thereof is smaller than the speed ratio γ3 and is equal to, e.g., about 1.000; and when the switching brake B0, the first clutch C1 and the second clutch C2 are engaged, the fifth speed step $5^{th}$ is established in which a speed ratio γ5 thereof is smaller than the speed ratio γ4 and is equal to, e.g., about 0.705. In addition, when the second clutch C2 and the third brake B3 are engaged, the reverse speed step R is established in which a speed ratio γR thereof is smaller than the speed ratio γ1 and greater than the speed ratio γ2, and is equal to, e.g., about 3.209. When the neutral position N is established, only the switching clutch C0 is engaged.

On the other hand, when the transmission system 10 operates as the CVT, both the switching clutch C0 and the switching brake B0 are disengaged as shown in FIG. 2. Thus, the non-step speed change portion 11 operates as the CVT, and the automatic speed change portion 20, connected in series to the portion 11, operates as the stepwise variable transmission. Therefore, when the automatic speed change portion 20 operates in each one of the first speed step $1^{st}$, the second speed step $2^{nd}$, the third speed step $3^{rd}$, and the fourth speed step $4^{th}$, the speed of the rotation inputted to the portion 20, i.e., the rotation speed of the transmission member 18 can be changed with no steps, i.e., continuously, so that each of the first to fourth speed steps has a speed-ratio range in which the speed ratio of the each speed step can be continuously changed. Thus, the speed ratio of the transmission system 10 as a whole can be continuously changed between each pair of adjacent speed steps out of the first to fifth speed steps. That is, a total speed ratio γT of the transmission system 10 as a whole is continuously changeable.

Figure 3:
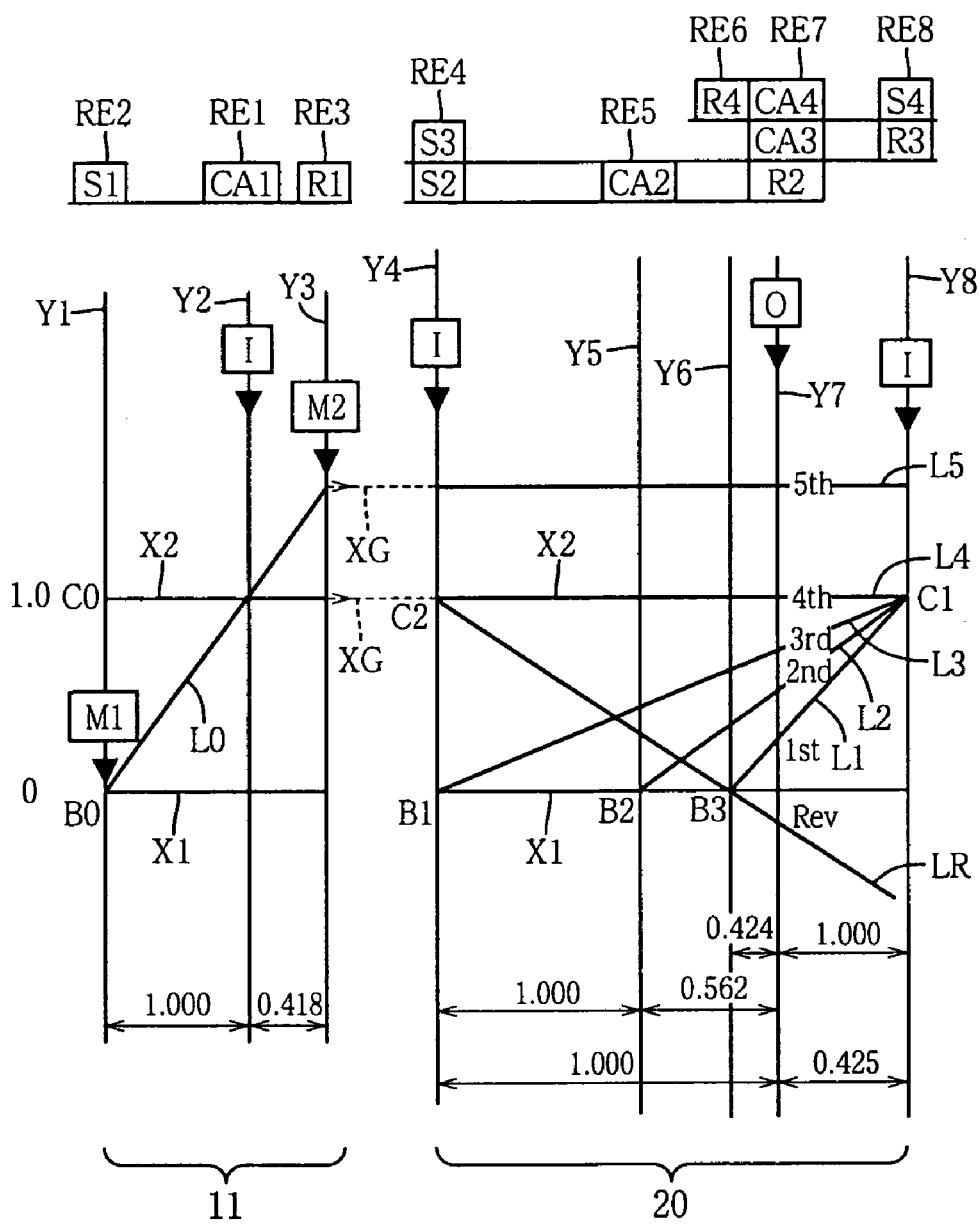
FIG. 3 is a collinear chart for explaining respective relative rotation speeds of eight rotary elements RE1 through RE8 in each of the stepwise speed change operations of the transmission system.

Thus, the transmission system 10 includes the non-step speed change portion 11 functioning as a differential portion or a first speed change portion; and the automatic speed change portion 20 functioning as an automatic speed change portion or a second speed change portion. FIG. 3 shows a collinear chart showing straight lines representing respective relationships among respective relative rotation speeds of first through eighth rotary elements RE1 through RE8, the relationships corresponding the different speed steps in which the eight rotary elements are connected to each other in different manners. The collinear chart of FIG. 3 is a two-dimensional coordinate system defined by an axis of abscissas indicative of gear ratios ρ of the first through fourth planetary gear sets 24, 26, 28, 30 and an axis of ordinates indicative of relative rotation speeds of the eight rotary elements. A lower horizontal solid line X1 indicates a rotation speed of 0 (zero); an upper horizontal solid line X2 indicates a rotation speed of 1.0 (one), i.e., the rotation speed $N_E$ of the engine 8 connected to the input shaft 14; and each of two horizontal broken lines XG indicates the rotation speed of the transmission member 18.

Three vertical lines Y1, Y2, Y3 correspond to the three elements of the power transfer 16 as a portion of the non-step speed change portion 11, respectively. In the order from the left toward the right, the first vertical line Y1 indicates a relative rotation speed of the first sun gear S1 corresponding to a second rotary element (i.e., a second element) RE2; the second vertical line Y2 indicates a relative rotation speed of the first carrier CA1 corresponding to a first rotary element (i.e., a first element) RE1; and the third vertical line Y3 indicates a relative rotation speed of the first ring gear R1 corresponding to a third rotary element (i.e., a third element) RE3. The three vertical lines Y1, Y2, Y3 are spaced from each other by respective distances defined according to the gear ratio ρ1 of the first planetary gear set 24. In addition, five vertical lines Y4, Y5, Y6, Y7, Y8 correspond to five elements of the automatic speed change portion 20, respectively. In the order from the left toward the right, the fourth vertical line Y4 indicates a relative rotation speed of the second and third sun gears S2, S3 connected to each other and corresponding to a fourth rotary element (i.e., fourth element) RE4; the fifth vertical line Y5 indicates a relative rotation speed of the second carrier CA2 corresponding to a fifth rotary element (i.e., a fifth element) RE5; the sixth vertical line Y6 indicates a relative rotation speed of the fourth ring gear R4 corresponding to a sixth rotary element (i.e., a sixth element) RE6; the seventh vertical line Y7 indicates a relative rotation speed of the second ring gear R2, third carrier CA3, and fourth carrier CA4 connected to each other and corresponding to a seventh rotary element (i.e., a seventh element) RE7; and the eighth vertical line Y8 indicates a relative rotation speed of the third ring gear R3 and the fourth sun gear S4 connected to each other and corresponding to an eighth rotary element (i.e., an eighth element) RE8. The five vertical lines Y4, Y5, Y6, Y7, Y8 are spaced from each other by respective distances defined according to the respective gear ratios ρ2, ρ3, ρ4 of the second, third, and fourth planetary gear sets 26, 28, 30. In the collinear chart of FIG. 3, if a distance between two vertical lines Y corresponding to the sun gear S and the carrier CA of each planetary gear set 24, 26, 28, 30 is equal to 1 (one), then a distance between the carrier CA and the ring gear R of the each planetary gear set 24, 26, 28, 30 is equal to the gear ratio ρ of the each planetary gear set 24, 26, 28, 30. More specifically described, in the non-step speed change portion 11, the distance between the two vertical lines Y1, Y2 is equal to 1, and the distance between the two vertical lines Y2, Y3 is equal to the gear ratio ρ1 of the first planetary gear set 24; and in the automatic speed change portion 20, a distance between two vertical lines Y corresponding to the sun gear S and the carrier CA of each of the second, third, and fourth planetary gear sets 26, 28, 30 is equal to 1 (one), and a distance between the carrier CA and the ring gear R of the each planetary gear set 26, 28, 30 is equal to the gear ratio ρ of the each planetary gear set 26, 28, 30.

Thus, the collinear chart of FIG. 3 indicates that in the power transfer 16 (or the non-step speed change portion 11) of the transmission system 10, the first rotary element RE1 (i.e., the first carrier CA1) of the first planetary gear set 24 is directly coupled to the input shaft 14, i.e., the engine 8, and is selectively connectable, via the switching clutch C0, to the second rotary element RE2 (i.e., the first sun gear S1); the second rotary element RE2 is connected to the first electric motor M1, and is selectively connectable, via the switching brake B0, to the case 12; the third rotary element RE3 (i.e., the first ring gear R1) is connected to the transmission member 18 and the second electric motor M2, so that the rotary motion (i.e., rotation) of the input shaft 14 is transmitted (i.e., inputted) via the transmission member 18 to the automatic speed change portion 20. An oblique straight line L0 passing through a point of intersection of the two lines Y2, X2 represents a relationship between the respective rotation speeds of the first sun gear S1 and the first ring gear R1.

For example, in the state in which both the switching clutch C0 and the switching brake B0 are released so that the power transfer 16 is switched to the non-step speed change state (i.e., the differential state), if the rotation speed of the first sun gear S1, indicated by an intersection point of the straight line L0 and the vertical line Y1, increases or decreases, the rotation speed of the first ring gear R1, indicated by an intersection point of the straight line L0 and the vertical line Y3, decreases or increases, respectively. In addition, when the switching clutch C0 is engaged and accordingly the first sun gear S1 and the first carrier CA1 are connected to each other, the power transfer 16 is switched to the non-differential state thereof in which the above-indicated three elements of the power transfer 16 are rotated altogether as an integral unit. Thus, the straight line L0 coincides with the horizontal line X2, i.e., the transmission member 18 is rotated at the same rotation speed as the rotation speed $N_E$ of the engine 8. Alternatively, when the switching brake B0 is engaged and accordingly the rotation of the first sun gear S1 is stopped, the power transfer 16 is switched to the different non-differential state thereof in which the power transfer 16 functions as the speed increase device. Therefore, the straight line L0 takes a state as shown in FIG. 3, and the rotation speed of the first ring gear R1 or the transmission member 18, indicated by an intersection point of the straight line L0 and the vertical line Y3, is inputted to the automatic speed change portion 20 after being increased from the engine rotation speed $N_E$.

In addition, the collinear chart of FIG. 3 indicates that in the automatic speed change portion 20, the fourth rotary element RE4 is selectively connectable, via the second clutch C2, to the transmission member 18, and is selectively connectable, via the first brake B1, to the case 12; the fifth rotary element RE5 is selectively connectable, via the second brake B2, to the case 12; the sixth rotary element RE6 is selectively connectable, via the third brake B3, to the case 12; the seventh rotary element RE7 is connectable to the output shaft 22; and the eighth rotary element RE8 is selectively connectable, via the first clutch C1, to the transmission member 18.

As shown in FIG. 3, in the automatic speed change portion 20, when the first clutch C1 and the third brake B3 are engaged, an intersection point of (A) an oblique straight line L1 passing through an intersection point of (a1) the vertical line Y8 indicating the rotation speed of the eighth rotary element RE8 and (a2) the horizontal line X2, and an intersection point of (a3) the vertical line Y6 indicating the rotation speed of the sixth rotary element RE6 and (a4) the horizontal line X1, and (B) the vertical line Y7 indicating the rotation speed of the seventh rotary element RE7 connected to the output shaft 22, indicates the rotation speed of the output shaft 22 that corresponds to the first speed step $1^{st}$. Likewise, when the first clutch C1 and the second brake B2 are engaged, an intersection point of (C) an oblique straight line L2 and (B) the vertical line Y7 indicating the rotation speed of the seventh rotary element RE7 connected to the output shaft 22, indicates the rotation speed of the output shaft 22 that corresponds to the second speed step $2^{nd}$; when the first clutch C1 and the first brake B1 are engaged, an intersection point of (D) an oblique straight line L3 and (B) the vertical line Y7 indicating the rotation speed of the seventh rotary element RE7 connected to the output shaft 22, indicates the rotation speed of the output shaft 22 that corresponds to the third speed step $3^{rd}$; and when the first clutch C1 and the second clutch C2 are engaged, an intersection point of (E) a horizontal straight line L4 and (B) the vertical line Y7 indicating the rotation speed of the seventh rotary element RE7 connected to the output shaft 22, indicates the rotation speed of the output shaft 22 that corresponds to the fourth speed step $4^{th}$. In each of the first, second, third, and fourth speed steps $1^{st}$, $2^{nd}$, $3^{rd}$, $4^{th}$, since the switching clutch C0 is engaged, the driving power is inputted, at the same rotation speed as the engine rotation speed $N_E$, from the power transfer 16 or the non-step speed change portion 11 to the eighth rotary element RE8. However, when the switching brake B0 is engaged in place of the switching clutch C0, the driving power is inputted, at the rotation speed higher than the engine rotation speed $N_E$, from the non-step speed change portion 11 to the eighth rotary element RE8. Thus, when the first clutch C1, the second clutch C2, and the switching brake B0 are engaged, an intersection point of (F) a horizontal straight line L5 and (B) the vertical line Y7 indicating the rotation speed of the seventh rotary element RE7 connected to the output shaft 22, indicates the rotation speed of the output shaft 22 that corresponds to the fifth speed step $5^{th}$.

Figure 4:
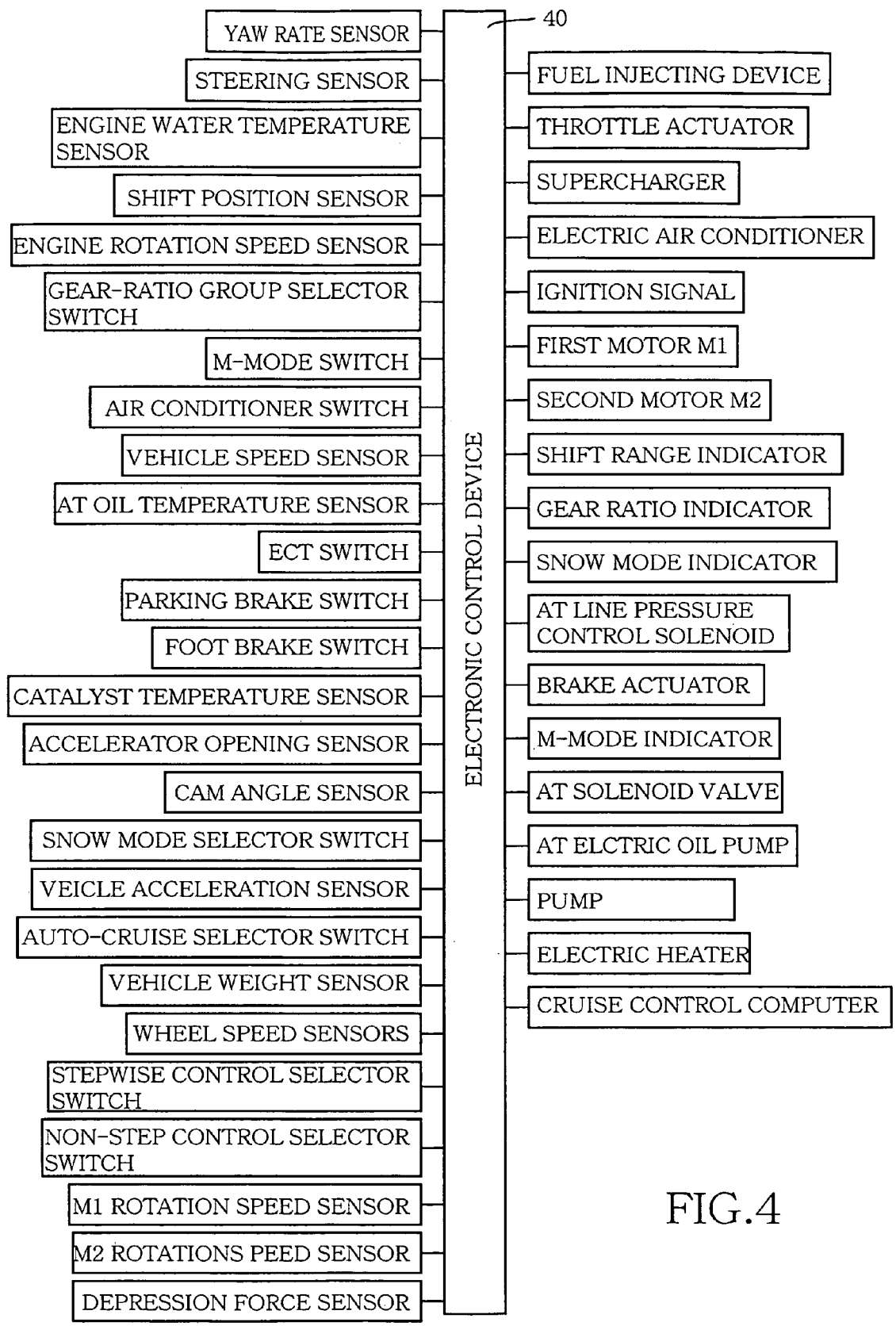
FIG. 4 is a diagrammatic view for explaining input and output signals of an electronic control device of the driving device.
Figure 5:
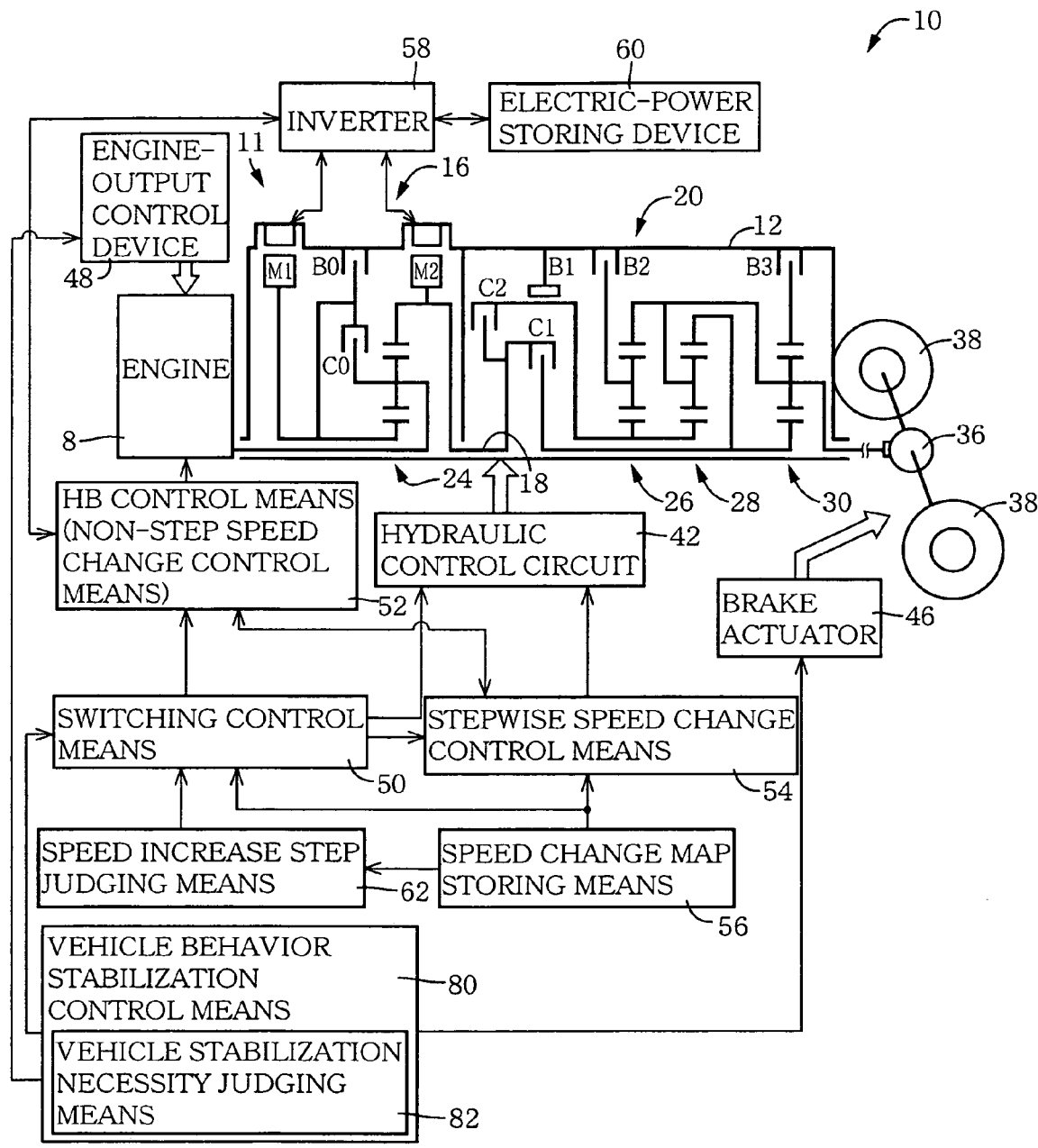
FIG. 5 is a diagrammatic view for explaining various control functions of the control device of FIG. 4.

FIG. 4 shows input signals that are inputted to the electronic control apparatus 40 that controls the transmission system 10; and output signals that are outputted from the control apparatus 40. The control apparatus 40 is essentially constituted by a so-called "microcomputer" including a CPU (central processing unit), a ROM (read only memory), a RAM (random access memory), and an input-and-output (I/O) interface, and processes those signals according to control programs pre-stored in the ROM, while utilizing a temporary storage function of the RAM. Thus, the control apparatus 40 performs a drive control of the transmission system 10, e.g., a hybrid drive control with respect to the electric motors M1, M2, and a speed change control with respect to the automatic speed change portion 20.

As shown in FIG. 4, the electronic control device 40 receives, from a yaw rate sensor, a yaw rate signal ω representing a yaw angular velocity (i.e., a yaw rate) as an angular velocity at which the vehicle's body is rotated about a vertical axis line; receives, from a steering sensor, a steering amount signal representing an angle, and a direction, of operation of a steering member; receives, from an engine water temperature sensor, a signal representing a temperature of water of the engine 8; receives, from a shift position sensor, a signal $P_{SH}$ representing a shift position; receives, from an engine rotation speed sensor, a signal representing the engine rotation speed $N_E$; receives, from a gear-ratio group selector switch, a signal representing selection of gear-ratio group; receives, from an M-mode switch, a signal commanding an M (motor run) mode; receives, from an air conditioner switch, a signal indicating operation of an electric air conditioner; receives, from a vehicle speed sensor, a vehicle speed signal corresponding to the rotation speed $N_{OUT}$ of the output shaft 22; receives, from an AT oil temperature sensor, an oil temperature signal representing a temperature of a hydraulic oil of the automatic speed change portion 20; receives, from an ECT switch, an ECT signal; receives, from a parking brake switch, a signal indicating operation of a parking brake; receives, from a foot brake switch, a signal indicating operation of a foot brake; receives, from a catalyst temperature sensor, a signal representing a temperature of a catalyst; receives, from an accelerator opening sensor, an accelerator opening signal Acc representing an amount of operation of an accelerator pedal; receives, from a cam angle sensor, a cam angle signal; receives, from a snow mode selector switch, a snow mode signal indicating selection of a snow mode; receives, from a vehicle acceleration sensor, an acceleration signal representing an acceleration of the vehicle; receives, from an auto-cruise selector switch, an auto-cruise signal indicating selection of an auto-cruise run mode; receives, from a vehicle weight sensor, a vehicle weight signal representing a weight of the vehicle; receives, from wheel speed sensors, wheel speed signals representing respective rotation speeds V of the drive wheels 38; receives, from a stepwise transmission switch, a signal indicating operation thereof to switch the non-step speed change portion 11 (or the power transfer 16) to the stepwise speed change state thereof (i.e., the locked or non-differential state thereof) so as to operate the transmission system 10 as the stepwise variable transmission; receives, from a non-step transmission switch, a signal indicating operation thereof to switch the non-step speed change portion 11 (or the power transfer 16) to the non-step speed change state thereof (i.e., the differential state thereof) so as to operate the transmission system 10 as the non-step variable transmission (i.e., the continuously variable transmission CVT); receives, from an M1 rotation speed sensor, a signal representing a rotation speed $N_{M1}$ of the first electric motor M1; receives, from an M2 rotation speed sensor, a signal representing a rotation speed $N_{M2}$ of the second electric motor M2; and receives, from a depression force signal, a depression force signal representing a force with which a brake pedal is depressed.

In addition, as shown in FIG. 4, the electronic control device 40 outputs a control signal to an engine output control device 48 (FIG. 5) that controls the output power of the engine 8, for example, outputs a drive signal to a throttle actuator that adjusts a degree of opening of an electronic throttle valve, a fuel supply signal to a fuel injection device that adjusts an amount of supply of fuel to the engine 8, and/or an ignition signal indicating a timing to ignite the engine 8; outputs, to a supercharger, a supercharger pressure adjust signal to adjust a supercharger pressure; outputs an electric air conditioner drive signal to drive the electric air conditioner; outputs a command signal to command operation of the first electric motor M1; outputs a command signal to command operation of the second electric motor M2; outputs a shift position display signal to operate a shift position indicator to display the shift position (i.e., operation position); outputs a gear ratio display signal to operate a gear ratio indicator to display the gear ratio; outputs a snow mode display signal to operate a snow mode indicator to display the snow mode; outputs a signal to control an AT line pressure control solenoid; outputs an M-mode display signal to operate an M-mode indicator to display the M mode; outputs valve operation signals to operate solenoid valves of a hydraulic control circuit 42 so as to control respective hydraulic actuators of the hydraulically operated frictional coupling devices of the non-step speed change portion 11 and the automatic speed change portion 20; outputs a drive signal to operate an electric hydraulic pump as a hydraulic pressure source of the hydraulic control circuit 42; outputs a signal to drive an electric heater; outputs a signal to a cruise control computer; and outputs a control signal to a brake actuator 46 (FIG. 5) that controls respective hydraulic pressures supplied to respective wheel cylinders of the drive wheels 38.

FIG. 5 is a diagrammatic view for explaining various control functions of the electronic control device 40. In FIG. 5, a stepwise speed change control means or device 54 judges, based on a vehicle state indicated by the vehicle speed V and an output torque $T_{OUT}$ of the automatic speed change portion 20, whether a speed change control of the transmission system 10 should be performed, according to a speed change map, shown in FIG. 6, that includes solid lines and one-dot chain lines and is pre-stored by a speed change map storing means or device 56. That is, the stepwise speed change control means 54 selects an appropriate one of the speed steps to which the transmission system 10 should be changed or shifted, and performs an automatic speed change control of the automatic speed change portion 20. More specifically described, the stepwise speed change control means 54 outputs, to the hydraulic control circuit 42, a command to cause the engaging and/or releasing of the hydraulically operated frictional coupling devices except for the switching clutch C0 or the switching brake B0, so as to establish an appropriate one of the speed steps according to the operation stable shown in FIG. 2.

A hybrid (HB) control means or device 52 controls the transmission system 10 to operate in the above-described non-step speed change state, i.e., controls the non-step speed change portion 11 to operate in the differential state, so that the engine 8 operates in a highly efficient operation range. In addition, the hybrid control means 52 changes and optimizes the distribution of driving force between the engine 8 and the second motor M2, and the reaction force resulting from the production of electric power by the first motor M1, so as to control the speed ratio γ0 of the non-step speed change portion 11 operating as the electric CVT, i.e., the non-step variable transmission. For example, the hybrid control means 52 first calculates, based on a current operation amount Acc of the accelerator pedal and a current running speed V of the vehicle, a driver's desired output, subsequently calculates a necessary driving force based on the driver's desired output and a desired value of charged electric power, then calculates an engine rotation speed $N_E$ and a total output, and finally controls, based on the total output and the engine rotation speed $N_E$, the output of the engine 8 and the amount of electric power produced by the first motor M1. In other words, even if the vehicle speed V and the speed ratio of the automatic speed change portion 20 are not changed, i.e., the rotation speed of the transmission member 18 is not changed, the hybrid control means 52 can control or change the engine rotation speed $N_E$ by controlling or changing the amount of electric power produced by the first motor M1.

The hybrid control means 52 performs its control operation while taking account of the speed step of the automatic speed change portion 20, for the purpose of improving the driving performance and fuel consumption rate of the vehicle. In this hybrid control, the non-step speed change portion 11 is controlled to function as the electric CVT, so that the engine rotation speed $N_E$ determined to operate the engine 8 in the efficient operation range, e.g., a target engine rotation speed $N_E^*$ matches the rotation speed of the transmission member 18 determined based on the vehicle speed V and the speed step of the automatic speed change portion 20. More specifically described, the hybrid control means 52 has a pre-stored optimum curve (i.e., a map or a relationship) that is experimentally determined, in advance, in a two-dimensional coordinate system defined by two parameters, i.e., engine rotation speed $N_E$ and engine torque $T_E$, so that when the vehicle runs in a non-step speed change control mode, the driving performance and the fuel consumption rate of the vehicle are compatible with each other. In order to operate the engine 8 according to the pre-stored optimum curve, the hybrid control means 52 determines a target value of the total speed ratio γT of the transmission system 10 so that the engine torque TE and the engine rotation speed NE produce an engine output needed to meet a desired driving force, and controls the speed ratio γ0 of the non-step speed change portion 11 so as to obtain the target value of the total speed ratio γT. Thus, the hybrid control means 52 controls or changes the total speed ratio γT in a permitted range in which the total speed ratio γT is permitted to be changed, e.g. a range of from 13 to 0.5.

The hybrid control means 52 supplies the electric energy or power produced by the first motor M1, to an electric-power storage device 60 and the second motor M2 via an inverter 58. Thus, though a main portion of the driving power of the engine 8 is mechanically transmitted to the transmission member 18, a portion of the driving power of the engine 8 is consumed by the first motor M1 to produce the electric energy, i.e., is converted into the electric power. Thus, the electric power produced by the first motor M1 is first supplied via the inverter 58 to the second motor M2 and, since the second motor M2 is driven, the electric power is subsequently supplied from the second motor M2 to the transmission member 18. All elements that are related to the production of the electric power, the supplying of the same, and the consumption of the same by the second motor M2 cooperate with each other to constitute an electric path that begins with the conversion of the portion of the driving power of the engine 8 into the electric power and ends with the conversion of the electric power into mechanical power.

In addition, even if the engine 8 may be in a stopped state or an idling state, the hybrid control means 52 can start or run the vehicle by operating the non-step speed change portion 11 as the electric CVT, that is, operating only the electric motor or motors, e.g., only the second motor M2, as the driving power source. Moreover, the hybrid control means 52 can start the vehicle by operating the engine 8 as the driving power source in place of the second motor M2. In the latter case, the hybrid control means 52 controls the starting of the vehicle by controlling the reaction force produced by the generation of electric power by the first motor M1 and operating the power transfer 16 as the differential device, and thereby increasing the rotation speed of the transmission member 18. As described above, usually, the starting of the vehicle is carried out by operating the second motor M2. However, depending upon the current state of the vehicle, the starting of the vehicle may be carried out by operating the engine 8.

Even if the vehicle may be in the stopped state or in a low-speed running state, the hybrid control means 52 can maintain an operating state of the engine 8 by operating the non-step speed change portion 11 as the electric CVT. For example, if, when the vehicle is in the stopped state, a state of charge, SOC, of the electric-power storage device 60 lowers and it is needed to operate the first motor M1 to generate electric power, the driving power of the engine 8 is used to operate the first motor M1 to generate electric power, i.e., increase the rotation speed of the first motor M1, so that the rotation speed $N_E$ of the engine 8 may be maintained, owing to the differential function of the power transfer 16, at not lower than a limit rotation speed at which the engine 8 can rotate on its own, through the rotation speed of the second motor M2, univocally determined by the vehicle speed V, may be equal (or substantially equal) to zero because the vehicle is in the stopped state.

In addition, irrespective of whether the vehicle may be in the stopped state or in the running state, the hybrid control means 52 can maintain the engine rotation speed $N_E$ at a certain rotation speed, by controlling the rotation speed NM1 of the first motor M1 and/or the rotation speed NM2 of the second motor M2, owing to the electric CVT function of the non-step speed change portion 11. In other words, the hybrid control means 52 can change the rotation speed NM1 of the first motor M1 or the rotation speed NM2 of the second motor M2, to a desired rotation speed, while maintaining the engine rotation speed $N_E$ at a certain rotation speed. For example, as can be understood from the collinear chart of FIG. 3, the hybrid control means 52 decreases the rotation speed NM2 of the second motor M2, by increasing the rotation speed NM1 of the first motor M1 while maintaining the engine rotation speed $N_E$ at a certain rotation speed.

The hybrid control means 52 can operate the first and second motors M1, M2 to "idle", that is, not to produce a reaction force. Thus, the hybrid control means 52 can place the non-step speed change portion 11 in a state equivalent to a state in which the portion 11 cannot transmit torque, i.e., a power transmission path in the portion 11 is disconnected.

Figure 6:
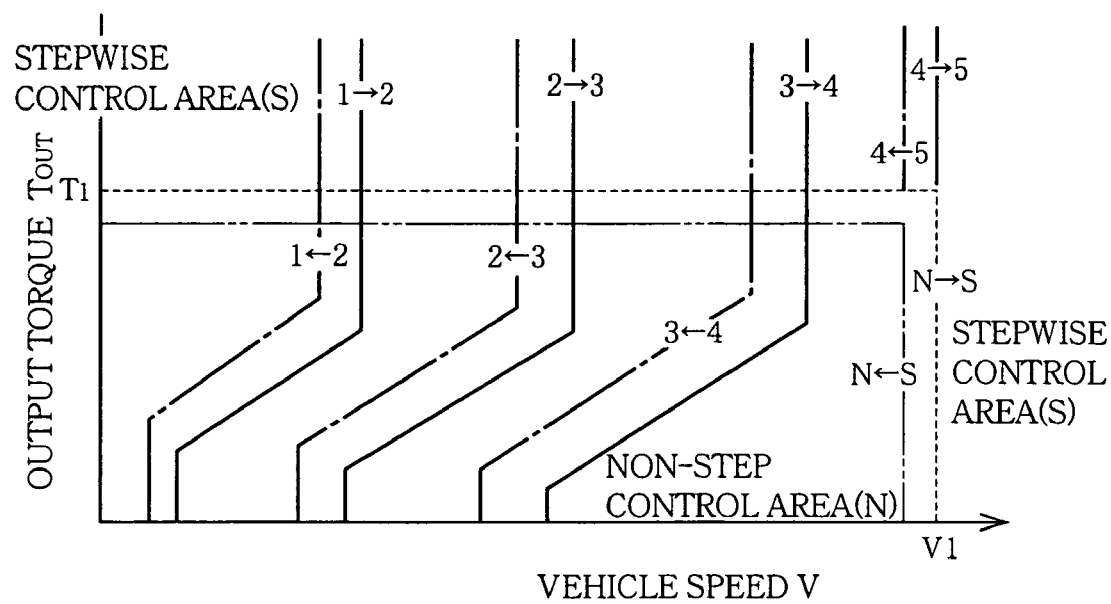
FIG. 6 is a view showing a relationship between (A) a pre-stored speed change map which is prepared in a two-dimensional coordinate system defined by two parameters, i.e., vehicle speed and output torque and according to which a speed step to which an automatic speed change portion of the transmission system is shifted is selected, and (B) a pre-stored state switch map which is prepared in the same two-dimensional coordinate system and according to which a speed change state to which the transmission system is switched is selected.

A speed increase step judging means or device 62 judges, based on the vehicle state and according to the speed change map of FIG. 6 pre-stored by the speed change map storing means 56, whether the speed step to which the transmission system 10 should be changed is a speed increase step, e.g., the fifth speed step $5^{th}$, for the purpose of judging which one of the switching clutch C0 and the switching brake B0 should be engaged when the transmission system 10 is switched to the stepwise speed change state.

A switching control means or device 50 judges, based on the vehicle state (i.e., the vehicle speed V and the output torque $T_{OUT}$) and according to a state switch map (i.e., a relationship) indicated at a broken line and a two-dot chain line in FIG. 6 and pre-stored by the speed change map storing means 56, to which one of the non-step speed change state and the stepwise speed change state the transmission system 10 should be switched, that is, in which one of (a) a non-step speed change control area in which the system 10 should be switched to the non-step speed change state and (b) a stepwise speed change control area in which the system 10 should be switched to the stepwise speed change state the vehicle state is. Thus, the switching control means 50 selectively switches the transmission system 10 to the non-step speed change state or the stepwise speed change state.

More specifically described, when the switching control means 50 judges that the vehicle state is in the stepwise speed change control area, the switching control means 50 outputs, to the hybrid control means 52, a signal not to permit, i.e., a signal to inhibit, the hybrid control means 52 from performing the hybrid control or the non-step speed change control, and outputs, to the stepwise speed change control means 54, a signal to permit the stepwise speed change control means 54 to perform a pre-set speed change control corresponding to the stepwise speed change state of the transmission system 10. More specifically described, the stepwise speed change control means 54 performs the automatic speed change control of the automatic speed change portion 20, according to the speed change map of FIG. 6 pre-stored by the speed change map storing means 56. FIG. 2, pre-stored by, e.g., the speed change map storing means 56, shows the combinations of respective operating states of the hydraulically operated frictional coupling devices, i.e., the clutches C0, C1, C2 and the brakes B0, B1, B2, B3 an appropriate one or ones of which is or are selected in the automatic speed change control. In short, the transmission system 10 as a whole, i.e. the non-step speed change portion 11 and the stepwise speed change portion 12 cooperate with each other to function as the so-called "stepwise automatic transmission" that establishes an appropriate one of the speed steps according to the operation table of FIG. 2.

For example, when the speed increase step judging means 62 judges or selects the fifth speed step $5^{th}$, the switching control means 50 outputs, to the hydraulic pressure control circuit 42, a command to cause the switching clutch C0 to be released and cause the switching brake B0 to be engaged, so that the non-step speed change portion 11 operates as an auxiliary transmission whose speed ratio γ0 is fixed at, e.g., 0.7. Thus, the transmission system 10 as a whole establishes a so-called "overdrive speed step", i.e., a speed increase step whose speed ratio is smaller than 1.0. On the other hand, when the speed increase step judging means 62 does not judge or select the fifth speed step $5^{th}$, the switching control means 50 outputs, to the hydraulic pressure control circuit 42, a command to cause the switching clutch C0 to be engaged and cause the switching brake B0 to be released, so that the non-step speed change portion 11 operates as an auxiliary transmission whose speed ratio γ0 is fixed at, e.g., 1. Thus, the transmission system 10 as a whole establishes a speed decrease step whose speed ratio is not smaller than 1.0. In short, the switching control means 50 switches the transmission system 10 to the stepwise speed change state and, in the stepwise speed change state, the non-step speed change portion 11 operates as the auxiliary transmission whose speed ratio γ0 can be selectively switched or changed between the two values corresponding to the two speed steps, and the automatic speed change portion 20 connected in series to the non-step speed change portion 11 operates as the stepwise variable transmission. Thus, the transmission system 10 as a whole functions as the so-called "stepwise automatic transmission".

On the other hand, when the switching control means 50 judges that the vehicle state falls in the non-step speed change control area in which the transmission system 10 should be switched to the non-step speed change state, the switching control means 50 outputs, to the hydraulic pressure control circuit 42, a command to cause the switching clutch C0 and the switching brake B0 to be released, so that the non-step speed change portion 11 is switched to the non-step speed change state, i.e., is permitted to change continuously the rotation speed. Simultaneously, the switching control means 50 outputs, to the hybrid control means 52, a signal to permit the hybrid control means 52 to perform the hybrid control, and outputs, to the stepwise speed change control means 54, a signal to cause the stepwise speed change control means 54 to be fixed at a pre-set speed step corresponding to the non-step speed change state of the transmission system 10, or a signal to permit the stepwise speed change control means 54 to perform the automatic speed change control of the automatic speed change portion 20 according to the speed change map of FIG. 6 pre-stored by the speed change map storing means 56. In this case, the stepwise speed change control means 54 performs the automatic speed change control according to the operation stable of FIG. 2, though the control means 54 does not operate the switching clutch C0 or the switching brake B0. In short, the switching control means 50 switches the non-step speed change portion 11 to the non-step speed change state, so that the non-step speed change portion 11 functions as the continuously variable transmission, and the automatic speed change portion 20 connected in series to the non-step speed change portion 11 functions as the stepwise variable transmission. Thus, an appropriate driving force is obtained. In addition, since the rotation speed inputted to the automatic speed change portion 20, i.e., the rotation speed of the transmission member 18 can be continuously changed in each of the first, second, third, and fourth speed steps $1^{st}$, $2^{nd}$, $3^{rd}$, $4^{th}$ of the portion 20, the speed ratio of each speed step can also be continuously changed. Since the speed ratio of each of the speed steps can be continuously changed, i.e., the speed ratio can be continuously changed between each pair of adjacent speed steps, the transmission system 10 as a whole can be switched to the non-step speed change state in which the total speed ratio γT is continuously changed.

Here, the graph shown in FIG. 6 is explained in detail. The graph of FIG. 6 shows the speed change map (i.e., the relationship), pre-stored by the speed change map storing means 56, that is used to select an appropriate one of the speed steps of the automatic speed change portion 20. The pre-stored speed change map is an example of a speed change map that is determined or prepared in a two-dimensional coordinate system defined by two parameters, i.e., vehicle speed V, and output torque $T_{OUT}$ as a sort of driving-force-related parameter. In FIG. 6, solid lines indicate shift-up operations and one-dot chain lines indicate shift-down operations. In addition, in FIG. 6, two broken lines indicate a reference vehicle speed V1 and a reference output torque T1 that are used by the switching control means 50 in judging whether the vehicle state is in the stepwise speed change control area or the non-step speed change control area. More specifically described, the first broken line in FIG. 6 is a high vehicle speed judgment line as a set of points each indicating the reference vehicle speed V1 as a high vehicle speed judgment value pre-set to judge whether the hybrid vehicle is running at a high speed; and the second broken line is a high output run judgment line as a set of points each indicating the reference output torque T1 as a high output run judgment value pre-set to judge whether the hybrid vehicle is running at a high value of the output torque $T_{OUT}$ of the automatic speed change portion 20 as a sort of driving-force-related parameter that is related to the driving force of the vehicle. Moreover, in FIG. 6, two two-dot chain lines indicate respective hystereses of the two broken lines that are used in judging whether the vehicle state is in the stepwise speed change control area or the non-step speed change control area. Thus, FIG. 6 shows the pre-stored state switch map (i.e., a relationship) that includes the reference vehicle speed V1 and the reference output torque T1 and is used by the switching control means 50 in judging, based on the two parameters, i.e., vehicle speed V and output torque $T_{OUT}$, whether the vehicle state is in the stepwise speed change control area or the non-step speed change control area. This state switch map may be stored as an integral portion of the speed change map by the speed change map storing means 56. In addition, this state switch map may be so modified as to include only one of the reference vehicle speed V1 and the reference output torque T1, or may be so modified as to employ, as a parameter, only one of the vehicle speed V and the output torque $T_{OUT}$.

In place of the speed change map and/or the state switch map, a judgment mathematic formula used for comparing an actual vehicle wheel V with the reference vehicle speed V1, and/or a judgment mathematic formula used for comparing an actual output torque Tour with the reference output torque T1 may be pre-stored by the speed change map storing means 56. In this case, for example, when the actual vehicle speed V as the vehicle state is higher than the reference vehicle speed V1, the switching control means 50 switches the transmission system 10 to the stepwise speed change state. Alternatively, for example, when the actual output torque $T_{OUT}$ of the automatic speed change portion 20 as the vehicle state is greater than the reference output torque T1, the switching control means 50 switches the transmission system 10 to the stepwise speed change state. The switching control means 50 may be adapted such that when electric control devices, such as one or more electric motors, to operate the non-step speed change portion 11 as the electric CVT fail or the performance thereof lowers, for example, when the performance of electric devices related to the electric path starting with the production of electric energy by the first electric motor M1 and ending with the conversion of the electric energy to the mechanical energy, lowers, that is, when the first electric motor M1, the second electric motor M2, the inverter 58, the storage device 60, and the transmission path connecting those elements M1, M2, 58, 60 with each other fail, or the performance of the elements M1, M2, 58, 60 and the transmission path lowers or is lost because of, e.g., failures or low temperature, the switching control means 50 switches, with priority, the transmission system 10 to the stepwise speed change state.

The above-described driving-force-related parameter corresponds, one by one, to the driving force of the vehicle, and may be not only a driving torque or force inputted to the drive wheels 38, but also, e.g., an actual value of the output torque $T_{OUT}$ of the automatic speed change portion 20, an engine torque $T_E$, a vehicle acceleration, or an engine torque $T_E$ calculated based on, e.g., an accelerator opening or a throttle opening (or an intake air amount, an air fuel ratio, or a fuel oil consumption) and the engine rotation speed $N_E$, or an estimated value of an engine torque $T_E$ or a desired driving force calculated based on an amount of operation of the accelerator pedal by the driver, or the throttle opening. The above-described driving torque may be calculated from, e.g., the output torque $T_{OUT}$ while taking account of, e.g., a differential ratio, or a radius of the drive wheels 38, or may be directly detected by, e.g., a torque sensor. These are true with the above-described other sorts of torques.

In addition, for example, the reference vehicle speed V1 is pre-set such that if the transmission system 10 is switched to the non-step speed change stage, when the vehicle is running at a considerably high speed but the fuel consumption rate is worsened at that speed, then the transmission system 10 is not switched to the non-step speed change stage, i.e., remains in the stepwise speed change stage at that speed. Moreover, the reference output torque T1 is so pre-set as to correspond to, e.g. such a characteristic of the first motor M1 that the motor M1 can be so disposed as to output, as a maximum electric-energy output thereof, a small electric energy, for the purpose of reducing the size of the motor M1 without causing the reaction torque of the motor M1 to follow the output of the engine 8 up to a high output range thereof when the vehicle is running at a high output.

Figure 7:
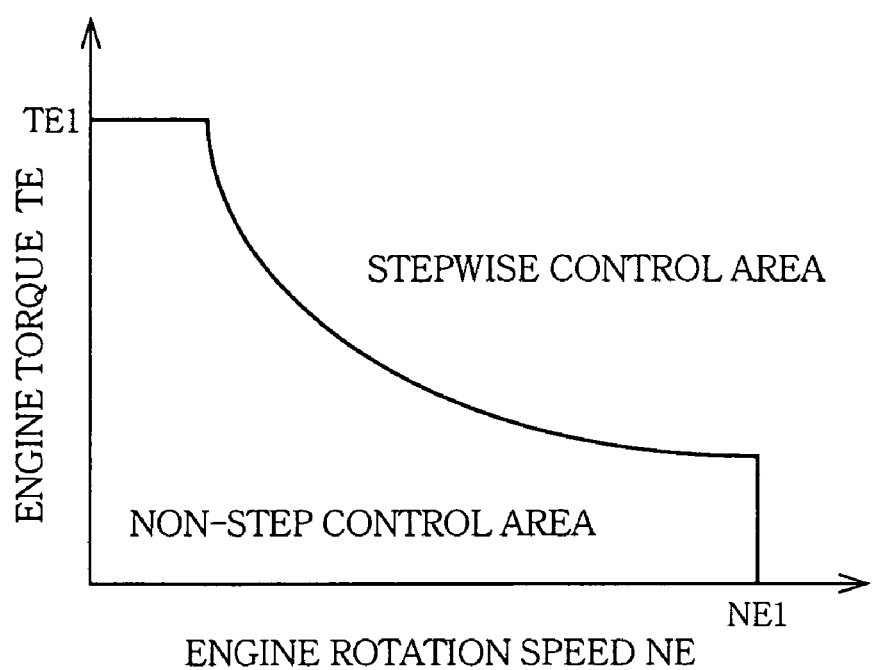
FIG. 7 is a view showing a pre-stored relationship which includes a boundary line between a non-step control area and a stepwise control area and which is used as a basis in preparing a boundary (indicated at broken line) between a non-step control area and a stepwise control area of the state switch map of FIG. 6.

FIG. 7 shows another state switch map (i.e., another relationship) that may be pre-stored by the speed change map storing means 56. This state switch map shows an engine output line as a boundary line that is used by the switching control means 50 in judging whether the current vehicle state indicated by two parameters, i.e., engine rotation speed $N_E$ and engine torque $T_E$ is in the stepwise speed change control area or in the non-step speed change control area. The switching control means 50 may use, in place of the state change map shown in FIG. 6, the state change map shown in FIG. 7, in judging whether the vehicle state indicated by the engine rotation speed $N_E$ and the engine torque $T_E$ is in the stepwise speed change control area or in the non-step speed change control area. The state switch map of FIG. 7 is used as a basis to determine the broken lines shown in FIG. 6. In other words, the broken lines of FIG. 6 are obtained by converting the state switch map (or the relationship) shown in FIG. 7 into the state switch map drawn in the two-dimensional coordinate system defined by the two parameters, i.e., vehicle speed V and output torque $T_{OUT}$.

In the relationship shown in FIG. 6, the stepwise speed change control area (abbreviated to the stepwise control area (S)) is defined as a high torque area not lower than the pre-set reference output torque T1, or a high vehicle speed area not lower than the pre-set reference vehicle speed V1. Thus, the stepwise speed change control is performed when the engine 8 is operated at a considerably high driving torque, or when the vehicle is running at a considerably high speed; and the non-step speed change control is performed when the engine 8 is operated at a considerably low driving torque, or when the vehicle is running at a considerably low speed, i.e., when the engine 8 is operated at a service output area. Likewise, in the relationship shown in FIG. 7, the stepwise control area (S) is defined as a high torque area not lower than a pre-set reference engine torque TE1, a high rotation speed area not lower than a pre-set reference engine rotation speed NE1, or a high output area not lower than a pre-set reference engine output calculated based on the engine torque $T_E$ and the engine rotation speed $N_E$. Thus, the stepwise speed change control is performed when the engine 8 is operated at a considerably high torque, a considerably high rotation speed, or a considerably high output; and the non-step speed change control is performed when the engine 8 is operated at a considerably low torque, a considerably low rotation speed, or a considerably low output, i.e., when the engine 8 is operated at a service output area. The boundary between the stepwise speed change control area (S) and the non-step speed change control area (N), shown in FIG. 7, corresponds to a reference high vehicle speed line as a set of points each indicating a reference high vehicle speed, and a reference high vehicle speed line as a set of points each indicating a reference high output.

Figure 8:
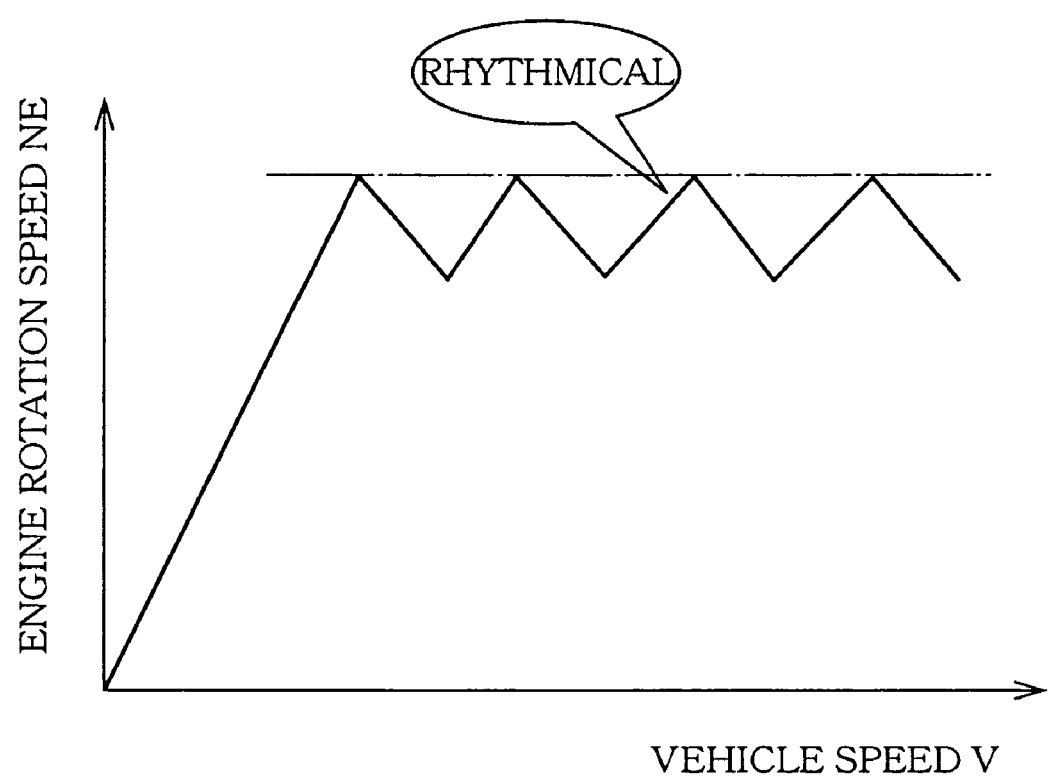
FIG. 8 is a graph showing an example of change of engine rotation speed when the speed steps of the transmission system operating as a stepwise variable transmission are shifted up.

Thus, for example, when the vehicle is running at a low or medium speed or at a low or medium output, the transmission system 10 is controlled to the non-step speed change state, so as to obtain a high fuel consumption rate of the vehicle. However, when the vehicle is running at a high speed, e.g., when the actual vehicle speed V exceeds the reference vehicle speed V1, the transmission system 10 is controlled to the stepwise speed change state in which the system 10 operates as the stepwise variable transmission, so that the output of the engine 8 is transmitted to the drive wheels 38, exclusively via the mechanical power transmission path, while restraining a conversion loss between the driving power and the electric energy that occurs when the system 10 operates as the electric CVT and thereby improving the fuel consumption rate of the vehicle. In addition, when the vehicle is running at a high output, e.g., when the above-described driving-force-related parameter such as the output torque $T_{OUT}$ exceeds the reference output torque T1, the transmission system 10 is controlled to the stepwise speed change state in which the system 10 operates as the stepwise variable transmission, so that the output of the engine 8 is transmitted to the drive wheels 38, exclusively via the mechanical power transmission path. Thus, the transmission system 10 is operated as the electric CVT only when the vehicle is running at the low or medium speed or at the low or medium output. Therefore, a maximum value of the electric energy to be produced by the first motor M1, i.e., the electric energy to be transmitted by the first motor M1 can be reduced, and accordingly the first motor M1, or the vehicle's driving device including the motor M1 can be reduced in size. In other words, it can be said that since the driver's desired driving force is more important than the desired fuel consumption rate when the vehicle is running at the high output, the transmission system 10 is switched to the stepwise speed change state (i.e., the constant speed change state) rather than to the non-step speed change state. Thus, the driver can enjoy rhythmical changes of the engine rotation speed $N_E$, as shown in FIG. 8, that are caused when the speed steps are shifted up in the stepwise automatic speed change state.

Back to FIG. 5, a vehicle behavior stabilization control means or device 80 as a vehicle behavior stabilization controller includes a vehicle stabilization necessity judging means or device 82 that judges whether a behavior of the vehicle in the running state becomes unstable and accordingly a vehicle behavior stabilization control is needed. If the vehicle stabilization necessity judging means 82 judges that the vehicle behavior stabilization control is needed, the vehicle behavior stabilization control means 80 controls the engine torque $T_E$ and/or respective braking forces applied to the drive wheels 38, and thereby controls respective torques of the drive wheels 38 (i.e., respective drive-wheel torques). Thus, the vehicle behavior stabilization control means 80 stabilizes the behavior of the vehicle.

Next, there will be described some examples in which the vehicle stabilization necessity judging means 82 judges that the vehicle behavior stabilization control is needed, and the operation of the vehicle behavior stabilization control means 80 to perform the vehicle behavior stabilization control.

For example, the previously-described VSC system stabilizes, when a turning behavior of the vehicle becomes unstable, the turning behavior of the vehicle. In this case, the vehicle stabilization necessity judging means 82 judges or detects how the drive wheels 38 tend to slip in a lateral direction. Based on a detected degree of tendency of lateral slipping of the drive wheels 38, the vehicle behavior stabilization control means 80 controls the engine torque $T_E$ and/or the braking forces applied to the drive wheels 38, and thereby reduces the tendency of lateral slipping of the drive wheels 38.

The vehicle stabilization necessity judging means 82 judges or detects, e.g., a tendency of lateral slipping of rear wheels of the vehicle, i.e., a so-called "over-steering" tendency that a turning angle of the rear wheels tends to be excessively great relative to an amount of operation of a steering member, in the following manner: First, the vehicle stabilization necessity judging means 82 calculates, based on the yaw rate signal ω and the acceleration signal that are supplied to the electronic control device 40, a slip angle, β, and a slip angular velocity, dβ/dt, of the vehicle's body that represents an inclination of the vehicle relative to a direction of movement of a gravity center of the vehicle. If the calculated slip angle β is greater than a pre-set slip angle and the calculated slip angular velocity dβ/dt is greater than a pre-set slip angular velocity, the vehicle stabilization necessity judging means 82 judges that the rear wheels of the vehicle tend to slip in the lateral direction. The pre-set slip angle and the pre-set slip angular velocity are reference values that are obtained and stored in advance from, e.g., experiments such that those pre-set values are usable in judging whether the rear wheels of the vehicle tend to slip in the lateral direction, to such a degree that needs a control of stabilizing the turning behavior of the vehicle.

In addition, the vehicle stabilization necessity judging means 82 judges or detects, e.g., a tendency of lateral slipping of front wheels of the vehicle, i.e., a so-called "under-steering" tendency that a turning angle of the front wheels tends to be excessively small relative to the amount of operation of the steering member, in the following manner: First, the vehicle stabilization necessity judging means 82 calculates, based on the steering amount signal and the vehicle speed signal that are supplied to the electronic control device 40, a target yaw rate ω* that corresponds to the amount of operation of the steering member and, if the actual yaw rate ω is smaller than the target yaw rate ω*, the judging means 82 judges that the front wheels of the vehicle tend to slip in the lateral direction.

If the vehicle stabilization necessity judging means 82 judges that the rear wheels of the vehicle tend to slip in the lateral direction, the vehicle behavior stabilization control means 80 outputs, to the brake actuator 46, a control signal to apply, according to, e.g., the degree of tendency of lateral slipping of the rear wheels, respective braking forces to the front and rear wheels of the vehicle that are located on the side opposite to the turning direction, so that a moment is produced in an outward direction of the vehicle, i.e., a rear-wheel-lateral-slip restraining moment is produced to restrain the tendency of lateral slipping of the rear wheels.

Thus, the vehicle speed V is decreased by the respective braking forces applied to the front and rear wheels of the vehicle, located on the side opposite to the turning direction. Thus, the turning behavior of the vehicle is stabilized.

If the vehicle stabilization necessity judging means 82 judges that the front wheels of the vehicle tend to slip in the lateral direction, the vehicle behavior stabilization control means 80 outputs, to the engine output control device 48, a control signal to restrain the engine torque $T_E$ according to, e.g., the degree of tendency of lateral slipping of the front wheels, and additionally outputs, to the brake actuator 46, a control signal to apply respective braking forces to the two rear wheels and the front wheel of the vehicle that is located on the side opposite to the turning direction, so that a front-wheel-lateral-slip restraining moment is produced to restrain the tendency of lateral slipping of the front wheels. Thus, the turning behavior of the vehicle is stabilized.

In addition, the previously-described ABS operates as a different sort of vehicle behavior stabilization control means than the VSC system. In this case, first, the vehicle stabilization necessity judging means 82 calculates, based on the wheel speed signals that are supplied to the electronic control device 40 and represent the respective rotation speeds of the drive wheels 38, respective rotation speeds, and respective rotation accelerations, of the four wheels of the vehicle, and detects, based on the calculated respective rotation speeds and respective rotation accelerations, how the drive wheels 38 are slipping. Based on the thus detected slipping of the drive wheels 38, the vehicle behavior stabilization control means 80 outputs, to the engine output control device 48, a control signal to control the respective braking forces applied to both the drive wheels 38. Thus, when the drive wheels 38 are braked, the drive wheels 38 can be prevented from being locked, and accordingly can exhibit an excellent braking performance. Therefore, the vehicle can maintain its high stability and steerability.

Here, it is assumed that the transmission system 10 is in the power transmission allowing state thereof in which the power transmission path from the engine 8 to the drive wheels 38 is connected and the vehicle can be driven, and simultaneously in the stepwise speed change state thereof. In this state, the engine 8 and the drive wheels 8 are mechanically connected to each other, and accordingly the engine rotation speed $N_E$ is influenced and bounded by the vehicle speed V. If, in this state, the vehicle behavior stabilization control means 80 performs the vehicle behavior stabilization control, the inertia of the engine 8 may change, and accordingly the effectiveness of the vehicle behavior stabilization control may lower. For example, if the inertia of the engine 8 changes, then the accuracy of control of braking forces applied to the drive wheels 38 may lower and accordingly the effectiveness of the stabilization control may lower. In other words, since the engine 8 cannot be rotated freely relative to the vehicle speed, a degree of freedom of control of the engine torque, i.e., a degree of freedom of control of the drive-wheel torques may lower and accordingly the effectiveness of the stabilization control may lower.

Hence, the switching control means 50 judges, based on the vehicle state and according to the state switch map of FIG. 6 pre-stored by the speed change map storing means 56, in which one of (a) the non-step speed change control area and (b) the stepwise speed change control area the vehicle state is, and thereby judges whether the transmission system 10 is in the stepwise speed change state. If the vehicle stabilization necessity judging means 82 judges that it is needed to perform the vehicle behavior stabilization control, and simultaneously the switching control means 50 judges that the transmission system 10 is in the stepwise speed change state, the switching control means 50 outputs, to the hydraulic control circuit 42, a command to cause the releasing of the switching clutch C0 or the switching brake B0, so that the non-step speed change portion 11 (or the power transfer 16) is released from the constant speed change state thereof. Thus, when the vehicle behavior stabilization control means 80 performs the vehicle behavior stabilization control, the switching control means 50 operates as a vehicle-stabilization-related switching control means or device as a vehicle-stabilization-related switching controller.

Thus, the engine 8 and the drive wheels 8 are released from the state in which they are mechanically connected to each other, and accordingly the engine 8 can be rotated freely relative to the vehicle speed V. Therefore, the degree of freedom of control of the vehicle behavior stabilization control means 80 with respect to the engine torque is improved. In addition, since the change of the engine rotation speed $N_E$ can be restrained without being bounded by the vehicle speed V, the change of the inertia of the engine 8 can be effectively restrained.

Figure 9:
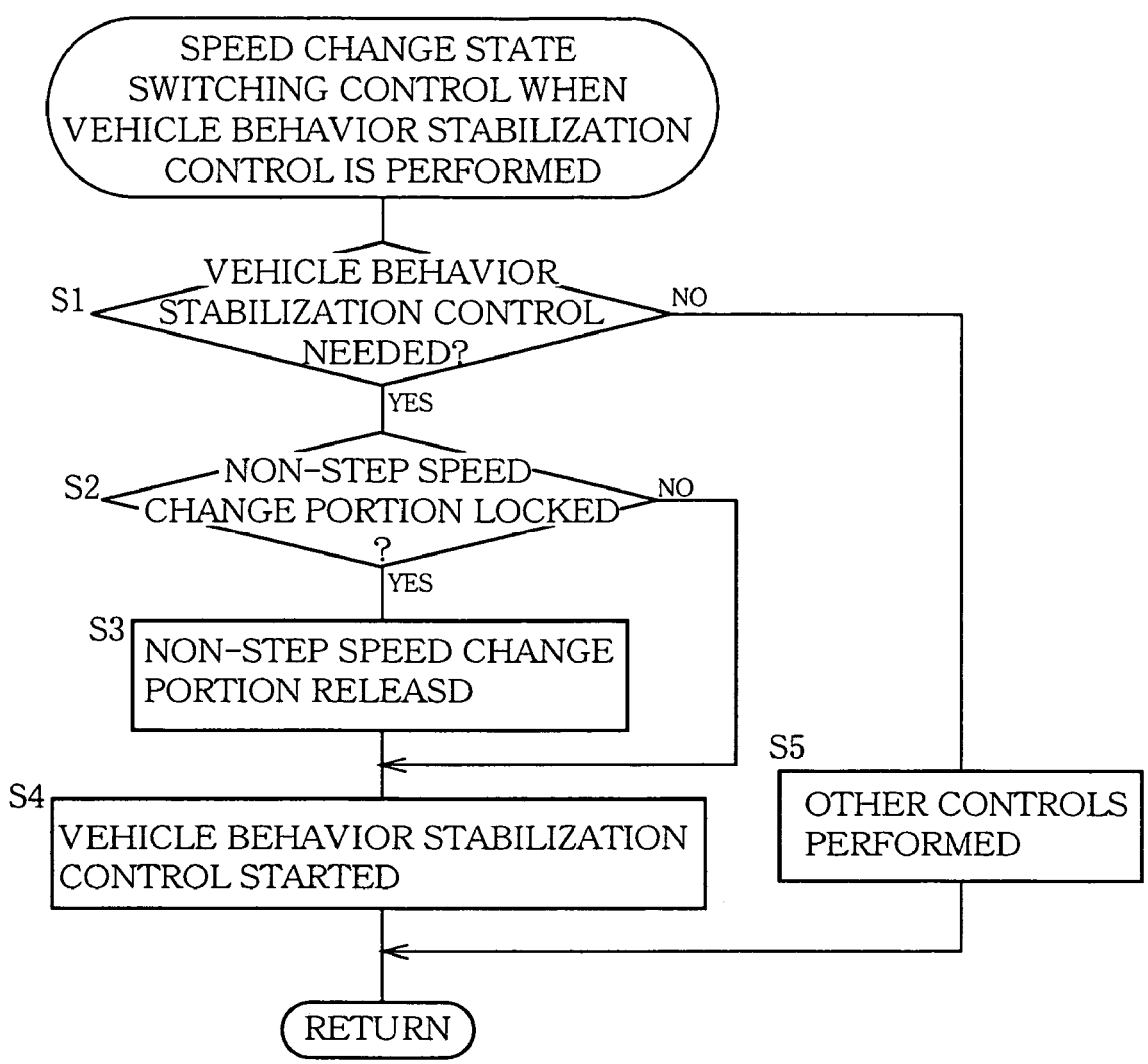
FIG. 9 is a flow chart for explaining a control operation of the control device of FIG. 5, i.e., a control operation thereof for switching speed change states of the transmission system when a vehicle behavior stabilization control operation is performed when a behavior of the vehicle in a running state is unstable.
Figure 10:
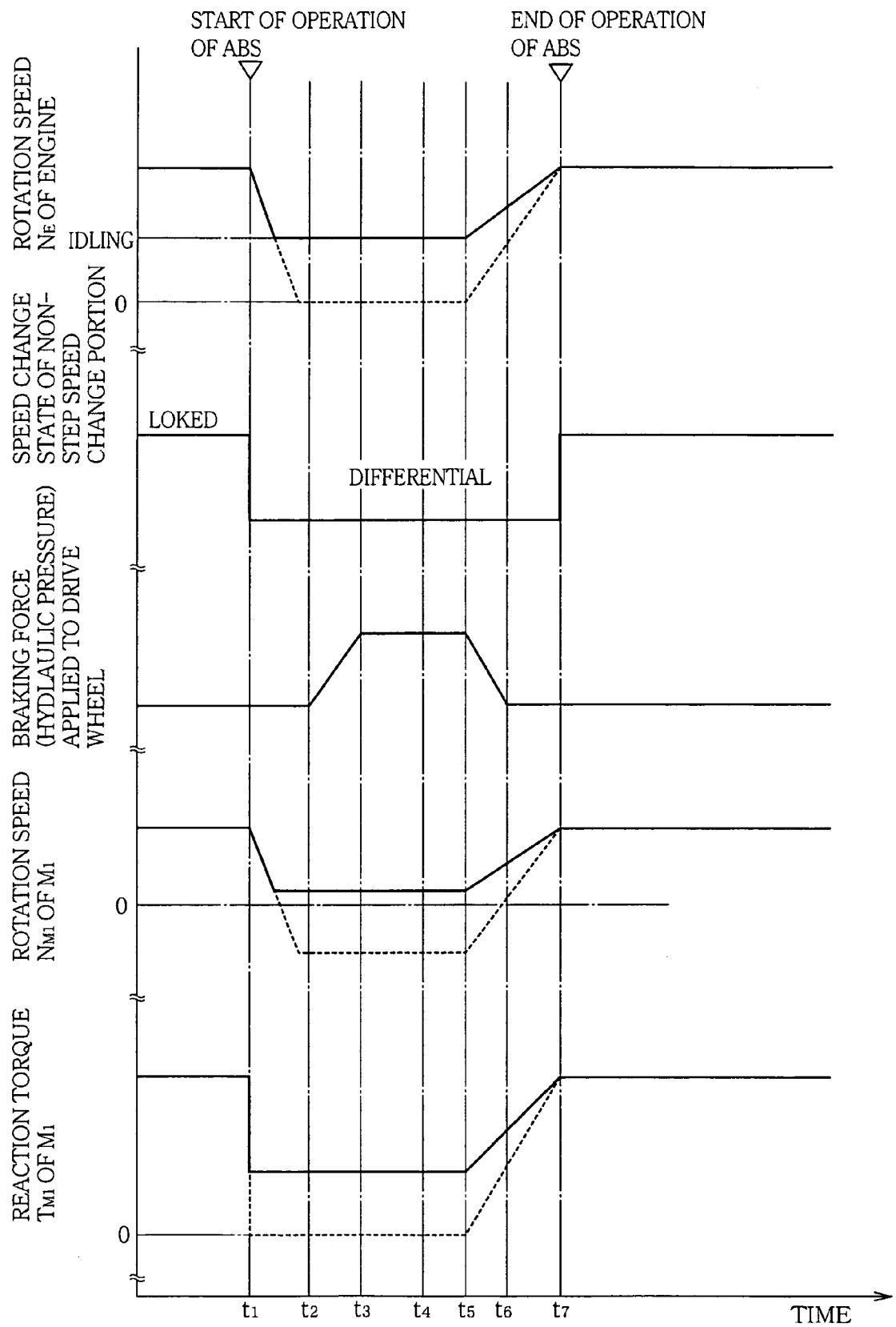
FIG. 10 is a time chart for explaining the control operation represented by the flow chart of FIG. 9, in particular, a control operation to control an ABS (anti-lock braking system) to stabilize a behavior of the vehicle when the vehicle is braked.

FIG. 9 is a flow chart representing a pertinent portion of various control operations of the electronic control device 40, i.e., a control operation thereof for switching the speed change states of the transmission system 10 when the behavior of the vehicle in the running state becomes unstable and the vehicle behavior stabilization control is needed. This control operation is repeated at a very short cycle time such as from several milliseconds to several tens of milliseconds. FIG. 10 shows a time chart for explaining the control operation according to the flow chart of FIG. 9, in particular, an example of this control operation that is performed when the previously-described ABS is operated to stabilize the behavior of the vehicle when the vehicle is braked.

First, at Step S1 corresponding to the vehicle stabilization necessity judging means 82, the control device 40 judges whether the behavior of the vehicle in the running state becomes unstable and accordingly the vehicle behavior stabilization control is needed. For example, this judgment is made by judging whether the rear wheels of the vehicle tend to slip in the lateral direction, e.g., judging whether the slip angle β, and the slip angular velocity dβ/dt, of the vehicle's body are greater than the pre-set slip angle and pre-set slip angular velocity, respectively. Alternatively, this judgment may be made by judging or detecting the slipping of the drive wheels 38, based on the wheel rotation speeds and the wheel rotation accelerations. If a negative judgment is made at Step S1, the control of the control device 40 goes to Step S5 to perform the other, ordinary control operations than the vehicle behavior stabilization control and the control operations to be performed together with the stabilization control, or maintain the current running state of the vehicle, and then quits the present routine.

On the other hand, if a positive judgment is made at Step S1, the control of the control device 40 goes to Step S2 corresponding to the switching control means 50. At Step S2, the control device 40 judges, based on the vehicle state and according to the state switch map of FIG. 6 pre-stored by the speed change map storing means 56, in which one of (a) the non-step speed change control area and (b) the stepwise speed change control area the vehicle state is, and thereby judges whether the transmission system 10 is in the stepwise speed change state. This is time $t_1$ shown in FIG. 10.

If a positive judgment is made at Step S2, the control of the control device 40 goes to Step S3 also corresponding to the switching control means 50. At Step S3, the control device 40 outputs, to the hydraulic control circuit 42, the command to cause the releasing of the switching clutch C0 or the switching brake B0, so that the non-step speed change portion 11 (or the power transfer 16) is released from the constant speed change state thereof (i.e., the locked state thereof). This is time $t_1$ shown in FIG. 10. As indicated by a time duration between time $t_1$ and time $t_2$ shown in FIG. 10, the non-step speed change portion 11 is temporarily switched from the locked state thereof to the differential state thereof, when the vehicle behavior stabilization control is performed.

After Step S3 is carried out, or when a negative judgment is made at Step S2, the control of the control device 40 goes to Step S4 corresponding to the vehicle behavior stabilization control means 80. At Step S4, the control device 40 controls the engine torque $T_E$ and/or the respective braking forces applied to the drive wheels 38, and thereby controls the respective drive-wheel torques, so as to stabilize the behavior of the vehicle. For example, if it is judged at Step S1 that the rear wheels of the vehicle tend to slip in the lateral direction, the control device 40 outputs, to the brake actuator 46, the control signal to apply, according to, e.g., the degree of tendency of lateral slipping of the rear wheels, the respective braking forces to the front and rear wheels of the vehicle that are located on the side opposite to the turning direction, so that the rear-wheel-lateral-slip restraining moment is produced to restrain the tendency of lateral slipping of the rear wheels. Thus, the vehicle speed V is decreased by the respective braking forces applied to the front and rear wheels of the vehicle, located on the side opposite to the turning direction. Thus, the turning behavior of the vehicle is stabilized. Alternatively, the slipping of the drive wheels 38 may be judged or detected at Step S1. In the latter case, based on the detected slipping of the drive wheels 38, the control device 40 outputs, to the brake actuator 46, the control signal to control the respective braking forces applied to both the drive wheels 38. Thus, when the drive wheels 38 are braked, the drive wheels 38 can be prevented from being locked, and accordingly can exhibit an excellent braking performance. Therefore, the vehicle can maintain its high stability and steerability. This is a time duration between time $t_1$ and time $t_7$ shown in FIG. 10.

When the vehicle behavior stabilization control is performed at Step S4, the non-step speed change portion 11 is released from the locked state thereof. Thus, the engine 8 can be rotated freely relative to the vehicle speed V. Therefore, the degree of freedom of control of the control device 40 with respect to the engine torque is improved, and accordingly the effectiveness of the vehicle behavior stabilization control is improved. In addition, since the change of the inertia of the engine 8 is restrained and the accuracy of control of the respective braking forces applied to the drive wheels 38 is improved, the effectiveness of the vehicle behavior stabilization control is improved.

As indicated by the time duration between time $t_1$ and time $t_2$ shown in FIG. 10, the engine rotation speed NE is released from the binding of the vehicle speed V, and is decreased down to an idling rotation speed. Thus, in a time duration between time $t_2$ and time $t_5$ shown in FIG. 10, the braking of the drive wheels 38 can be controlled in a state in which the influence of the inertia of the engine 8 to the drive wheels 38 is decreased, and accordingly the responsiveness of the braking control is improved. In addition, as indicated by a time duration between time $t_5$ and time $t_7$ shown in FIG. 10, the hybrid control means 52 increases the rotation speed $N_{M1}$ of the first motor M1, so that the engine rotation speed $N_E$ is controlled toward a rotation speed corresponding to the vehicle speed V and the non-step speed change portion 11 is prepared to return to the stepwise speed change state thereof. Then, as indicated by time $t_7$ in FIG. 10, after the vehicle behavior stabilization control has been performed the switching control means 50 outputs, to the hydraulic control circuit 42, the command to cause the engaging of the switching clutch C0 or the switching brake B0, so that the non-step speed change portion 11 is prepared to return to the stepwise speed change state thereof.

As indicated by broken lines in FIG. 10, when the non-step speed change portion 11 is in the differential state thereof, the hybrid control means 52 may control the first motor M1 and the second motor M2 (not shown in FIG. 10) to "idle", i.e., control the first and second motors M1, M2 to produce no torques, or substantially no torques, so that the engine rotation speed $N_E$ becomes equal to zero. Thus, the braking of the drive wheels 38 can be controlled in a state free of the inertia of the engine 8. When the first and second motors M1, M2 idle, the non-step speed change portion 11 is placed in a neutral state thereof in which the portion cannot transmit power.

As is apparent from the foregoing description of the present embodiment, the transmission system 10 includes the non-step speed change portion 11 that is selectively switchable to the non-step speed change state thereof or the stepwise speed change state thereof. When the vehicle behavior stabilization control means 80 performs the vehicle behavior stabilization control, the switching control means 50 causes the releasing of the switching clutch C0 or the switching brake B0, and thereby releases the non-step speed change portion 11 from the stepwise speed change state thereof (i.e., the locked state thereof). Thus, the drive wheels 38 and the engine 8 are released from the state in which they are mechanically connected to each other, and accordingly the engine 8 is allowed to rotate freely relative to the drive wheels 38. Therefore, the degree of freedom of control of the vehicle behavior stabilization control means 80 with respect to the torques applied to the drive wheels 38 is improved, and accordingly the effectiveness of the vehicle behavior stabilization control performed by the vehicle behavior stabilization control means 80 is improved.

Next, there will be described other embodiments of the present invention. In the following description, the same reference numerals as used in the first embodiment are used to designate the corresponding elements or parts of the additional embodiments, and the description of those elements or parts is omitted.

<Second Embodiment>

Figures 11, 12:
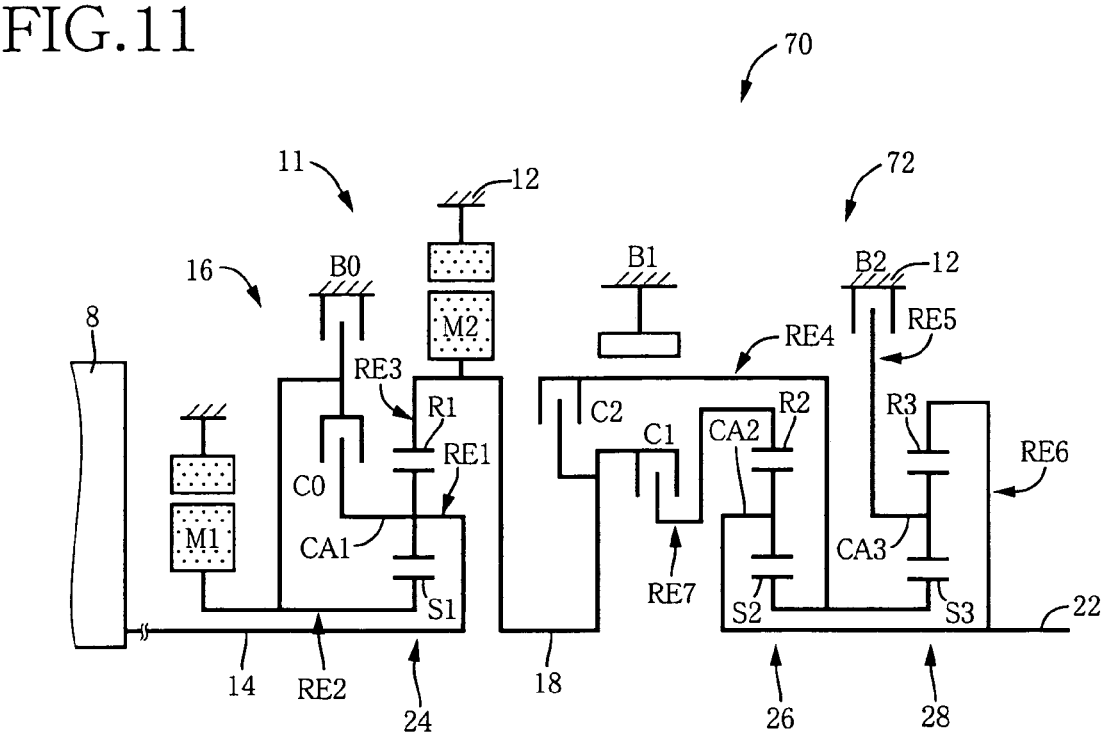
FIG. 11 is a schematic view corresponding to FIG. 1, for explaining a construction of a transmission system as a portion of a driving device of another hybrid vehicle as a second embodiment of the present invention.
FIG. 12 is an operation table corresponding to FIG. 2, representing a relationship between non-step or stepwise speed change operations of the transmission system of FIG. 11, and combinations of respective operating states of hydraulically operated frictional coupling devices that are used to perform those speed change operations, respectively.
Figure 13:
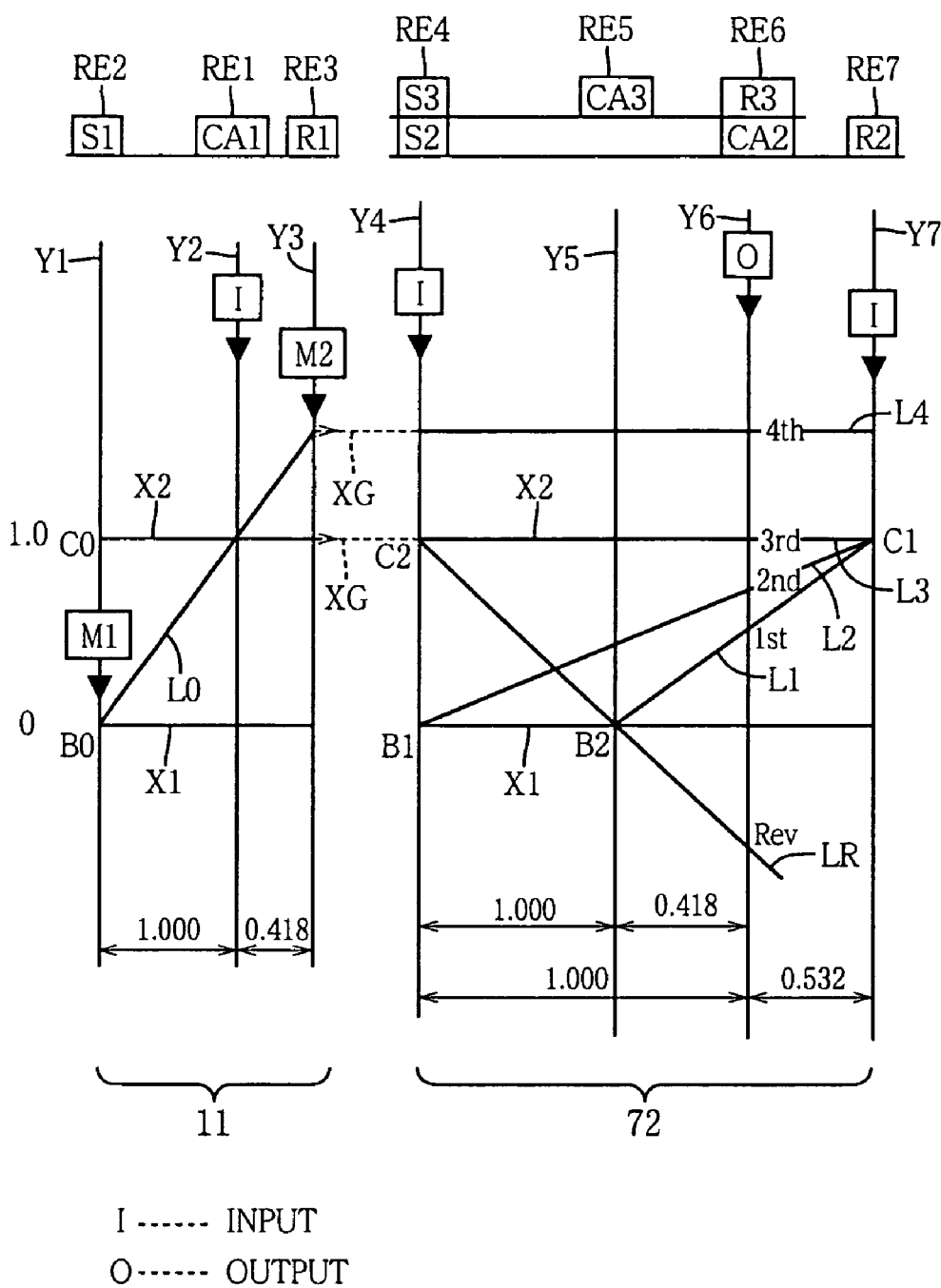
FIG. 13 is a collinear chart corresponding to FIG. 3, for explaining respective relative rotation speeds of seven rotary elements RE1 through RE7 in each of the stepwise speed change operations of the transmission system of FIG. 11.

FIG. 11 is a schematic view for explaining a transmission system 70 constituting a portion of another driving device to which the present invention is applied; FIG. 12 is an operation table representing a relationship between speed steps of the transmission system 70 and corresponding combinations of respective operating states of hydraulically operated frictional coupling devices; and FIG. 13 is a collinear chart for explaining speed change operations of the transmission system 70.

Like the transmission system 10 employed in the first embodiment, the transmission system 70 employed in the present, second embodiment includes the non-step (i.e., continuous) speed change portion 11 including the first electric motor M1, the power transfer 16, and the second electric motor M2. In addition, the transmission system 70 includes an automatic speed change portion 72 that is provided between the non-step speed change portion 11 and the output shaft 22, is connected, in series, to the non-step speed change portion 11 via the transmission member 18, and has three speed steps. The power transfer 16 includes the single-pinion first planetary gear set 24 having the pre-determined gear ratio ρ1, e.g., about 0.418; the switching clutch C0; and the switching brake B0. The automatic speed change portion 72 includes a single-pinion second planetary gear set 26 and a single-pinion third planetary gear set 28. The second planetary gear set 26 has a pre-determined gear ratio ρ2, e.g., about 0.532; and the third planetary gear set 28 has a pre-determined gear ratio ρ3, e.g., about 0.418. In the stepwise speed change portion 70, a second sun gear S2 of the second planetary gear set 26 and a third sun gear S3 of the third planetary gear set 28 are integrally connected to each other, are selectively connectable to the transmission member 18 via a second clutch C2, and are selectively connectable to the case 12 via a first brake B1; a second carrier CA2 of the second planetary gear set 26 and a third ring gear R3 of the third planetary gear set 28 are integrally connected to each other and are connected to the output shaft 22; a second ring gear R2 of the second planetary gear set 26 is selectively connectable to the transmission member 18 via a first clutch C1; and a third carriage CA3 of the third planetary gear set 28 is selectively connectable to the case 12 via a second brake B2.

In the transmission system 70 constructed as described above, the switching clutch C0, the first clutch C1, the second clutch C2, the switching brake B0, the first brake B1, and the second brake B2 are selectively engaged or disengaged (i.e., released), as indicated in the operation table shown in FIG. 12, so as to establish selectively an arbitrary one of a first speed step ($1^{st}$), a second speed step ($2^{nd}$), a third speed step ($3^{rd}$), a fourth speed step ($4^{th}$), a reverse speed step (R), and a neutral position (N). Respective speed ratios γ(=(rotation speed $N_{IN}$ of input shaft 14)/(rotation speed $N_{OUT}$ of output shaft 22)) of the first through fourth speed steps $1^{st}$ through $4^{th}$ change with a substantially same ratio. In the operation table of FIG. 12, symbol "○" indicates an engaged state of each of the clutches C0, C1, C2 and the brakes B1, B2; and symbol "⊙" indicates an engaged state of each of the switching clutch and brake C0, B0 when the non-step speed change portion 11 operates in the constant speed change state in which the portion 11 functions as the transmission whose speed ratio is fixed, and a disengaged (released) state of the same C0, B0 when the portion 11 operates in the non-step speed change state in which the portion 11 functions as the electric CVT. In the present embodiment, the power transfer 16 employs the switching clutch C0 and the switching brake B0 and, when either the switching clutch C0 or the switching brake B0 is engaged, the non-step speed change portion 11 can be selectively switched to the constant speed change state, in place of the non-step speed change state. Therefore, when either the switching clutch C0 or the switching brake B0 is engaged, the transmission system 70 can take a stepwise speed change state in which the non-step speed change portion 11, switched to the constant speed change state, cooperates with the automatic speed change portion 72 to operate as a stepwise variable transmission; and when neither the switching clutch C0 nor the switching brake B0 is engaged, the transmission system 70 can take a non-step (i.e., continuous) speed change state in which the non-step speed change portion 11, switched to the non-step speed change state, cooperates with the automatic speed change portion 72 to operate as an electrical CVT. In short, when either the switching clutch C0 or the switching brake B0 is engaged, the transmission system 70 is switched to the stepwise speed change state; and when neither the switching clutch C0 nor the switching brake B0 is engaged, the transmission system 10 is switched to the non-step speed change state.

For example, when the transmission system 70 operates as the stepwise variable transmission, and simultaneously when the switching clutch C0, the first clutch C1 and the second brake B2 are engaged as shown in FIG. 12, the first speed step $1^{st}$ is established in which a maximum value of a speed ratio γ1 thereof is equal to, e.g., about 2.804; when the switching clutch C0, the first clutch C1 and the first brake B1 are engaged, the second speed step $2^{nd}$ is established in which a speed ratio γ2 thereof is smaller than the speed ratio γ1 and is equal to, e.g., about 1.531; when the switching clutch C0, the first clutch C1 and the second clutch C2 are engaged, the third speed step $3^{rd}$ is established in which a speed ratio γ3 thereof is smaller than the speed ratio γ2 and is equal to, e.g., about 1.000; and when the switching brake B0, the first clutch C1 and the second clutch C2 are engaged, the fourth speed step $4^{th}$ is established in which a speed ratio γ4 thereof is smaller than the speed ratio γ3 and is equal to, e.g., about 0.705. In addition, when the second clutch C2 and the second brake B2 are engaged, the reverse speed step R is established in which a speed ratio γR thereof is smaller than the speed ratio γ1 and greater than the speed ratio γ2, and is equal to, e.g., about 2.393. When the neutral position N is established, only the switching clutch C0 is engaged.

On the other hand, when the transmission system 70 operates the electric CVT, both the switching clutch C0 and the switching brake B0 are disengaged (released) as shown in FIG. 12. Thus, the non-step speed change portion 11 operates as the electric CVT, and the automatic speed change portion 72, connected in series to the portion 11, operates as the stepwise variable transmission. Therefore, when the stepwise speed change portion 70 operates in each one of the three speed steps corresponding to the first speed step $1^{st}$, the second speed step $2^{nd}$, and the third speed step $3^{rd}$, the rotation speed inputted to the portion 70, i.e., the rotation speed of the transmission member 18 can be changed with no steps, i.e., continuously, so that each one of the speed steps has a speed-ratio range in which the speed ratio of the each speed step can be continuously changed. Thus, the speed ratio of the transmission system 70 can be continuously changed between each pair of adjacent speed steps out of the first through fourth speed steps. That is, a total speed ratio γT of the transmission system 70 as a whole can be continuously changed.

Thus, the transmission system 70 includes the non-step speed change portion 11 functioning as a differential portion or a first speed change portion; and the automatic speed change portion 72 functioning as an automatic speed change portion or a second speed change portion. FIG. 13 shows a collinear chart showing straight lines representing respective relationships among respective relative rotation speeds of first through seventh rotary elements RE1 through RE7, the relationships corresponding the different speed steps in which the rotary elements are connected to each other in different manners. The respective rotation speeds of the first through third rotary elements RE1 through RE3 of the power transfer 16 when both the switching clutch and brake C0, B0 are disengaged or when either the switching clutch or brake C0, B0 is engaged are the same as those of the first through third rotary elements RE1 through RE3 employed in the first embodiment.

In FIG. 13, four vertical lines Y4, Y5, Y6, Y7 correspond to four elements of the stepwise speed change portion 70, respectively. In the order from the left to the right, the fourth vertical line Y4 indicates a relative rotation speed of the second and third sun gears S2, S3 connected to each other and corresponding to a fourth rotary element RE4; the fifth vertical line Y5 indicates a relative rotation speed of the third carrier CA3 corresponding to a fifth rotary element RE5; the sixth vertical line Y6 indicates a relative rotation speed of the second carrier CA2 and the third ring gear R3 connected to each other and corresponding to a sixth rotary element RE6; and the seventh vertical line Y7 indicates a relative rotation speed of the second ring gear R2 corresponding to a seventh rotary element RE7. In the automatic speed change portion 72, the fourth rotary element RE4 is selectively connectable, via the second clutch C2, to the transmission member 18, and is selectively connectable, via the first brake B1, to the case 12; the fifth rotary element RE5 is selectively connectable, via the second brake B2, to the case 12; the sixth rotary element RE6 is connected to the output shaft 22; and the seventh rotary element RE7 is selectively connectable, via the first clutch C1, to the transmission member 18.

As shown in FIG. 13, in the automatic speed change portion 72, when the first clutch C1 and the second brake B2 are engaged, an intersection point of (A) an oblique straight line L1 passing through an intersection point of (a1) the vertical line Y7 indicating the rotation speed of the seventh rotary element RE7 (R2) and (a2) the horizontal line X2, and an intersection point of (a3) the vertical line Y5 indicating the rotation speed of the fifth rotary element RE5 and (a4) the horizontal line X1, and (B) the vertical line Y6 indicating the rotation speed of the sixth rotary element RE6 connected to the output shaft 22, indicates the rotation speed of the output shaft 22 that corresponds to the first speed step $1^{st}$. Likewise, when the first clutch C1 and the first brake B1 are engaged, an intersection point of (C) an oblique straight line L2 and (B) the vertical line Y6 indicating the rotation speed of the sixth rotary element RE6 connected to the output shaft 22, indicates the rotation speed of the output shaft 22 that corresponds to the second speed step $2^{nd}$; and when the first clutch C1 and the second clutch C2 are engaged, an intersection point of (D) an oblique straight line L3 and (B) the vertical line Y6 indicating the rotation speed of the sixth rotary element RE6 connected to the output shaft 22, indicates the rotation speed of the output shaft 22 that corresponds to the third speed step $3^{rd}$. In each of the first, second, and third speed steps $1^{st}$, $2^{nd}$, $3^{rd}$, since the switching clutch C0 is engaged, the driving power from the non-step speed change portion 11 is inputted, at the same rotation speed as the engine rotation speed $N_E$, to the seventh rotary element RE7. However, when the switching brake B0 is engaged in place of the switching clutch C0, the driving power from the non-step speed change portion 11 is inputted, at the rotation speed higher than the engine rotation speed $N_E$, to the seventh rotary element RE7. Thus, when the first clutch C1, the second clutch C2, and the switching brake B0 are engaged, an intersection point of (F) a horizontal straight line L4 and (B) the vertical line Y6 indicating the rotation speed of the sixth rotary element RE6 connected to the output shaft 22, indicates the rotation speed of the output shaft 22 that corresponds to the fourth speed step $4^{th}$.

Thus, the present transmission system 70 includes the non-step speed change portion 11 functioning as the differential portion or the first speed change portion, and the automatic speed change portion 72 functioning as the automatic speed change portion or the second speed change portion. Therefore, the driving device including the transmission system 70 can enjoy the same advantages as the above-described advantages of the driving device including the transmission system 10.

<Third Embodiment>

Figure 14:
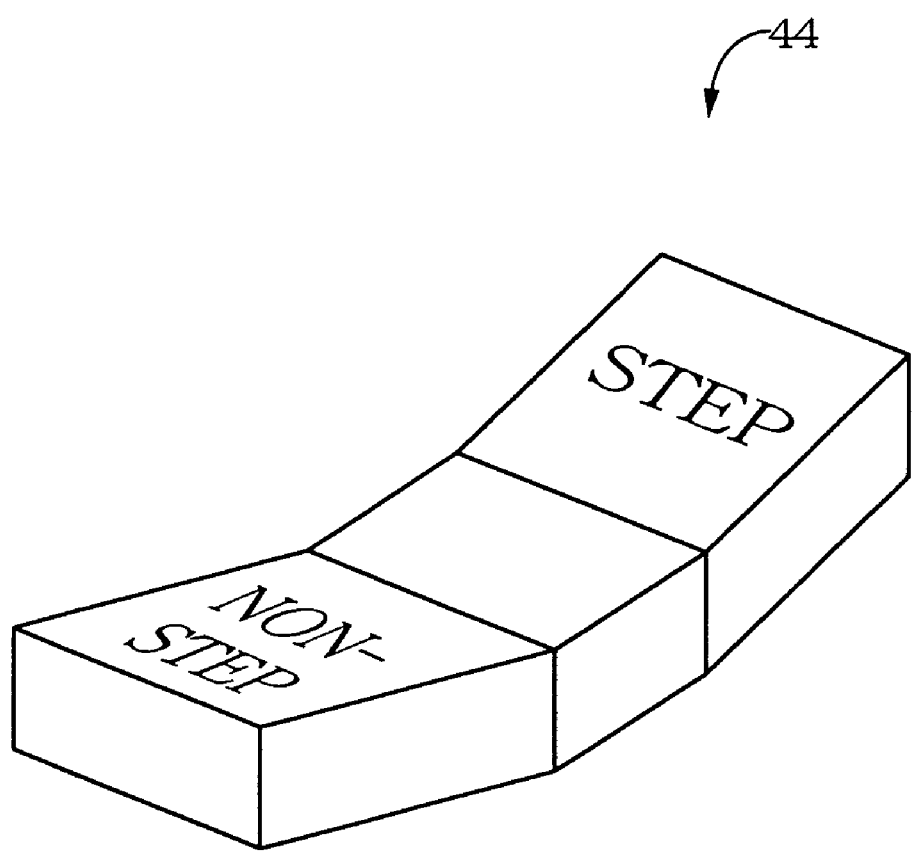
FIG. 14 is a view of a seesaw-type switch as a sort of a switching device that constitutes a portion of a speed change state selecting device that is manually operable by a driver.

FIG. 14 shows a seesaw-type switch 44 (hereinafter, simply referred to as the switch 44) as a portion of a speed change state manual selector that is manually operable by a driver for selectively switching the power transfer 16 to the differential state or to the non-differential state, i.e., the transmission system 10, 70 to the non-step speed change state or the stepwise speed change state. The switch 44 may be provided, in each of the above-described first and second embodiments, in the hybrid vehicle such that the switch 44 is manually operable by the driver. This switch 44 enables the driver to run the vehicle in a desired or selected one of the different speed change control modes. The switch 44 includes a first portion that is labeled "STEP" and corresponds to the stepwise speed change control mode, and a second portion that is labeled "NON-STEP" and corresponds to the non-step speed change control mode. When the driver pushes the first or second portion of the switch 44, the driver can select the non-step speed change control mode in which the transmission system 10, 70 is switched to the non-step speed change state so as to operate as the electric CVT, or the stepwise speed change control mode in which the transmission system 10, 70 is switched to the stepwise speed change state so as to operate as the stepwise variable transmission. In each of the first and second embodiments, the speed change state of the transmission system 10, 70 is automatically switched, based on the change of the vehicle state, according to, e.g., the state switch map shown in FIG. 6 or FIG. 7. In place of, or in addition to, this automatic state switch control mode, the third embodiment employs the manual state switch control mode in which the speed change state of the transmission system 10, 70 is manually switched by the operation of the switch 44. That is, when the switch 44 is manually operated to select an arbitrary one of the non-step speed change state and the stepwise speed change state, the switching control means 50 switches, with priority, the transmission system 10, 70 to the thus selected speed change state. For example, when the driver wants to feel the operation of the electric CVT and/or obtain the fuel consumption rate improving effect, the driver can manually operate the switch 44 to select the non-step speed change state; and when the driver wants to feel the change of the engine rotation speed caused by the speed change control of the automatic speed change portion 20, the driver can manually operate the switch 44 to select the stepwise speed change state. The switch 44 may be modified to be able to take selectively a neutral operation position different than two operation positions corresponding to the non-step speed change state and the stepwise speed change state, respectively. In the latter case, when the switch 44 is operated to select the neutral operation position, neither the non-step speed change state nor the stepwise speed change state is selected. Thus, the selection of the neutral operation position indicates that the driver does not want to select either the non-step speed change state nor the stepwise speed change state, i.e., wants to select the automatic state switch control mode. In addition, even in the case where the switch 44 is selectively operated to switch intentionally the transmission system 10 to the stepwise speed change state thereof, the switching control means 50 releases the non-step speed change portion 11 from the stepwise speed change state thereof (i.e., the locked state thereof, when the vehicle behavior stabilization control means 80 performs the vehicle behavior stabilization control.

While the present invention has been described in its preferred embodiments, it is to be understood that the present invention may be otherwise embodied.

For example, in each of the illustrated embodiments, the transmission system 10, 70 is arranged such that the non-step speed change portion 11 (or the power transfer 16) can be selectively switched to the differential state thereof in which the portion 11 is operable as the electric CVT, and to the non-differential state thereof in which the portion 11 is not operable as the electric CVT, and accordingly the transmission system 10, 70 can be selectively switched to the non-step speed change state thereof and to the stepwise speed change state thereof. That is, the transmission system 10, 70 is switched between the non-step speed change state thereof and the stepwise speed change state thereof, by switching the non-step speed change portion 11 between the differential state thereof and the non-differential state thereof. However, for example, when the non-step speed change portion 11 remains in the differential state thereof, the speed ratio of the portion 11 may be changed not continuously but stepwise, so that the portion 11 may operate as a stepwise variable transmission. In other words, the differential and non-differential states of the non-step speed change portion 11 do not correspond, one by one, to the non-step and stepwise speed change states of the transmission system 10, 70, respectively. Therefore, the transmission system 10, 70 need not be so arranged as to be selectively switchable to the non-step or stepwise speed change state thereof. That is, the present invention is applicable to the vehicle's driving device wherein the transmission system 10, 70 (the non-step speed change portion 11 or the power transfer 16) is so arranged as to be selectively switchable to the differential or non-differential state thereof.

In each of the illustrated embodiments, the VSC system and the ABS are described as the examples of the Vehicle behavior stabilization control means 80, and the principle of the present invention is used when the VSC system or the ABS is operated. However, the principle of the present invention may be used when a different vehicle behavior stabilization control means 80 than the VSC system or the ABS is operated to stabilize an unstable behavior of the vehicle. For example, when the vehicle is started or accelerated on, e.g., a slippery road surface, the throttle may be opened too largely by the driver and accordingly an excessively great torque may be applied to the drive wheels 38, so that the drive wheels 38 may slip on the road surface and accordingly the acceleration of the vehicle upon starting thereof or the controllability of the vehicle may be lowered. In this case, a TRC (traction control) system, known in the art, may be operated to control the braking forces applied to the drive wheels 38, and control the engine torque, so as to restrain the slipping of the drive wheels 38, and additionally maintain the driving force suitable for the condition of the road surface, and maintain an acceleration performance of the vehicle upon starting thereof, a straight-run performance of the vehicle, and a turning stability of the same.

In each of the illustrated embodiments, the switching control means 50 (Step S3 of FIG. 9) temporarily releases, when the vehicle behavior stabilization control is performed, the switching clutch C0 or the switching brake B0, and thereby releases the non-step speed change portion 11 from the constant speed change state thereof (i.e., the locked state thereof). However, the switching clutch C0 or the switching brake B0 may not be fully released, for example, may be placed in a partly engaged state or in a waiting state under a low hydraulic pressure. In each of the latter cases, the switching clutch C0 or the switching brake B0 can be quickly engaged after the vehicle behavior stabilization control has been performed.

In addition, in each of the illustrated embodiments, the power transfer 16 includes the first carrier CA1 connected to the engine 8, the first sun gear S1 connected to the first electric motor M1, and the first ring gear R1 connected to the transmission member 18. However, the engine 8, the first motor M1, and the transmission member 18 may be connected to the three elements CA1, S1, R1 of the first planetary gear set 24, in different manners. For example, each of the engine 8, the first motor M1, and the transmission member 18 may be connected to any one of the three elements CA1, S1, R1.

In each of the illustrated embodiments, the engine 8 is directly coupled with the input shaft 14. However, the engine 8 may be operatively connected via a gear, a belt, etc. to the input shaft 14. Moreover, the engine 8 need not be provided such that the engine 8 is coaxial with the input shaft 14.

In each of the illustrated embodiments, the first and second electric motors M1, M2 are coaxial with the input shaft 14, the first motor M1 is connected to the first sun gear S1, and the second motor M2 is connected to the transmission member 18. However, the first motor M1 may be operatively connected via a gear, a belt, etc. to the first sun gear S1; and the second motor M2 may be operatively connected via a gear, a belt, etc. to the transmission member 18.

In each of the illustrated embodiments, the power transfer 16 includes the switching clutch C0 and the switching brake B0. However, it is not needed to employ both the clutch C0 and the brake B0. In addition, in each of the illustrated embodiments, the switching clutch C0 selectively connects the sun gear S1 and the carrier CA1 to each other. However, the clutch C0 may be modified such that the clutch C0 selectively connects the sun gear S1 and the ring gear R1 to each other, or selectively connects the carrier CA1 and the ring gear R1 to each other. In short, the switching clutch C0 may be modified such that the clutch C0 selectively connects arbitrary two elements of the three elements S1, CA1, R1 of the first planetary gear set 24.

In each of the illustrated embodiments, the transmission system 10, 70 is controlled to the neutral position "N", by causing the engaging of the switching clutch C0. However, the neutral position "N" may be established without causing the engaging of the clutch C0.

In each of the illustrated embodiments, the hydraulically operated frictional coupling devices such as the switching clutch and brake C0, B0 may be replaced with magnetic-powder type, electromagnetic type, or mechanical type coupling devices such as powder (magnetic powder) clutches, electromagnetic clutches, or dog clutches.

In each of the illustrated embodiments, the second electric motor M2 is connected to the transmission member 18. However, the second motor M2 may be connected to the output shaft 22, or an arbitrary one of the rotary elements of the automatic speed change portion 20, 72.

In each of the illustrated embodiments, the automatic speed change portion 20, 72 is provided, in the power transmission path, between the transmission member 18 as the output member of the non-step speed change portion 11 or the power transfer 16, and the drive wheels 38. However, a different sort of power transmission device such as a continuously variable transmission (CVT) as a sort of automatic transmission may be provided. In the case where the continuously variable transmission (CVT) is employed, the transmission system 10, 70 as a whole is switched to a stepwise speed change state thereof when the power transfer 16 is switched to the constant speed change state thereof. The stepwise speed change state is a state in which the power is transmitted exclusively via the mechanical transmission path, without being transmitted via the electric transmission path. Optionally, the continuously variable transmission may be arranged such that a plurality of fixed speed ratios corresponding to a plurality of speed steps of a stepwise variable transmission are stored in a memory and the speed steps of the automatic speed change portion 20, 72 are changed or shifted according to the plurality of fixed speed ratios. Otherwise, the present invention is applicable to such a transmission system wherein the automatic speed change portion 20, 70 is not employed.

In each of the illustrated embodiments, the automatic speed change portion 20, 72 is connected, in series, via the transmission member 18 to the non-step speed change portion 11. However, it is possible to provide a counter shaft extending parallel to the input shaft 14, and provide the automatic speed change portion 20, 72 such that the portion 20, 72 is coaxial with the counter shaft. In the latter case, the non-step speed change portion 11 and the automatic speed change portion 20, 72 may be connected to each other via, e.g., a group of transmission members including a pair of counter gears, a sprocket, and a chain, such that the driving power can be transmitted from the portion 11 to the portion 20, 72.

In each of the illustrated embodiments, the power transfer 16 as the differential device may be replaced with, e.g., a differential gear unit including a pinion that is driven or rotated by the engine 8, a pair of bevel gears that are meshed with the pinion, and the first and second electric motors M1, M2 that are operatively connected to the two bevel gears.

In each of the illustrated embodiments, the power transfer 16 is constituted by the single planetary gear set. However, the power transfer 16 may be constituted by two or more planetary gear sets, so that the power transfer 16 can operate, in the non-differential state thereof, as a transmission having three or more speed steps.

In each of the illustrated embodiments, the switch 44 is of the seesaw type. However, the switch 44 may be replaced with any type of switch that is operable to select an arbitrary one of at least the non-step speed change state (the differential state) and the stepwise speed change state (the non-differential state); such as a pushbutton type switch, a pair of pushbutton type switches which cannot be concurrently kept at respective pushed states, i.e., either one of which can be kept at the pushed state thereof, a lever type switch, a slide type switch, etc. In addition, in each of the illustrated embodiments, the switch 44 may be modified to have the neutral operation position, as described previously. However, in place of the modification of the switch 44, it is possible to employ another switch that is operable to adopt or neglect the non-step or stepwise speed change state selected through the operation of the switch 44, i.e., select the neutral operation position of the switch 44.

It is to be understood that the present invention may be embodied with various other changes, modifications and improvements that may occur to a person skilled in the art, in the light of the technical teachings of the present invention that have been described above.

What is claimed is:

1. A control apparatus for use with a driving device of a vehicle, the driving device including (A) a non-step speed change portion which includes (a1) a differential device that distributes an output of an engine to a first electric motor and a transmission member, and (a2) a second electric motor that is provided in a power transmission path from the transmission member to a plurality of drive wheels, and which is operable as an electric, continuously variable transmission, and (B) an automatic speed change portion which constitutes a portion of the power transmission path and functions as an automatic transmission, the control apparatus comprising:

a vehicle behavior stabilization controller which is for stabilizing a behavior of the vehicle when the behavior of the vehicle is unstable;

a coupling device which is selectively switchable to (a) a released state thereof in which the coupling device places the non-step speed change portion in a non-step speed change state thereof in which the non-step speed change portion is operable as the electric continuously variable transmission, and (b) an engaged state thereof in which the coupling device places the non-step speed change portion in a stepwise speed change state thereof in which the non-step speed change portion is not operable as the electric continuously variable transmission; and a vehicle-stabilization-related switching controller which switches, when the vehicle behavior stabilization controller performs a vehicle behavior stabilization control, the coupling device to the released state thereof.

2. A control apparatus for use with a driving device of a vehicle, the driving device including a power transmission device which includes (a1) a differential device that distributes an output of an engine to a first electric motor and a transmission member, and (a2) a second electric motor that is provided in a power transmission path from the transmission member to a plurality of drive wheels, and which is operable as an electric differential system, the control apparatus comprising:

a vehicle behavior stabilization controller which is for stabilizing a behavior of the vehicle when the behavior of the vehicle is unstable;

a coupling device which is associated with the differential device and which is for selectively switching the differential device to (a) a differential state thereof in which the differential device exhibits a differential function and to (b) a locked state thereof in which the differential device does not exhibit the differential function; and a vehicle-stabilization-related switching controller which operates, when the vehicle behavior stabilization controller performs a vehicle behavior stabilization control, the coupling device to switch the differential device to the differential state thereof.

3. The control apparatus according to claim 1, wherein the non-step speed change portion is placed in the non-step speed change state thereof when the differential device is switched by the coupling device to a differential state thereof in which the differential device exhibits a differential function, and the non-step speed change portion is placed in the stepwise speed change state thereof when the differential device is switched by the coupling device to a locked state thereof in which the differential device does not exhibit the differential function.

4. The control apparatus according to claim 3, wherein the differential device includes a first element connected to the engine, a second element connected to the first electric motor, and a third element connected to the transmission member.

5. The control apparatus according to claim 4, wherein the coupling device switches the differential device to the differential state thereof, by allowing the first, second, and third elements to be rotated relative to each other, and switches the differential device to the locked state thereof, by allowing the first, second, and third elements to be rotated as an integral unit.

6. The control apparatus according to claim 4, wherein the coupling device switches the differential device to the differential state thereof, by allowing the first, second, and third elements to be rotated relative to each other, and switches the differential device to the locked state thereof, by inhibiting the second element from being rotated.

7. The control apparatus according to claim 4, wherein the coupling device comprises at least one of (a) a clutch which selectively connects at least two elements of the first, second, and third elements, to each other, so that the first, second, and third elements are rotated as an integral unit, and (b) a brake which selectively connects the second element to a non-rotary element so that the second element is inhibited from being rotated.

8. The control apparatus according to claim 7, wherein the differential device is switched, when the clutch and the brake is released, to the differential state thereof in which the first, second, and third elements are rotated relative to each other, and wherein when the clutch is engaged and the brake is released, the differential device is switched to the locked state thereof in which the differential device operates as a transmission whose speed ratio is equal to 1.

9. The control apparatus according to claim 7, wherein the differential device is switched, when the clutch and the brake is released, to the differential state thereof in which the first, second, and third elements are rotated relative to each other, and wherein when the brake is engaged and the clutch is released, the differential device is switched to the locked state thereof in which the differential device operates as a speed increase transmission whose speed ratio is smaller than 1.

10. The control apparatus according to claim 4, wherein the differential device comprises a planetary gear set including a carrier, a sun gear, and a ring gear, and the first, second, and third elements of the differential device comprise the carrier, the sun gear, and the ring gear, respectively.

11. The control apparatus according to claim 10, wherein the planetary gear set comprises a single-pinion planetary gear set including a pinion.

12. The control apparatus according to claim 1, wherein a total speed ratio of the driving device is defined by a speed ratio of the automatic speed change portion and a speed ratio of the non-step speed change portion.

13. The control apparatus according to claim 2, further comprising an automatic speed change portion which constitutes a portion of the power transmission path, wherein a total speed ratio of the driving device is defined by a speed ratio of the automatic speed change portion and a speed ratio of the differential device.

14. The control apparatus according to claim 1, wherein the automatic speed change portion comprises a stepwise automatic transmission.

15. The control apparatus according to claim 2, wherein the differential device includes a first element connected to the engine, a second element connected to the first electric motor, and a third element connected to the transmission member.

16. The control apparatus according to claim 15, wherein the coupling device switches the differential device to the differential state thereof, by allowing the first, second, and third elements to be rotated relative to each other, and switches the differential device to the locked state thereof, by allowing the first, second, and third elements to be rotated as an integral unit.

17. The control apparatus according to claim 15, wherein the coupling device switches the differential device to the differential state thereof, by allowing the first, second, and third elements to be rotated relative to each other, and switches the differential device to the locked state thereof, by inhibiting the second element from being rotated.

18. The control apparatus according to claim 15, wherein the coupling device comprises at least one of (a) a clutch which selectively connects at least two elements of the first, second, and third elements, to each other, so that the first, second, and third elements are rotated as an integral unit, and (b) a brake which selectively connects the second element to a non-rotary element so that the second element is inhibited from being rotated.

19. The control apparatus according to claim 18, wherein the differential device is switched, when the clutch and the brake is released, to the differential state thereof in which the first, second, and third elements are rotated relative to each other, and wherein when the clutch is engaged and the brake is released, the differential device is switched to the locked state thereof in which the differential device operates as a transmission whose speed ratio is equal to 1.

20. The control apparatus according to claim 18, wherein the differential device is switched, when the clutch and the brake is released, to the differential state thereof in which the first, second, and third elements are rotated relative to each other, and wherein when the brake is engaged and the clutch is released, the differential device is switched to the locked state thereof in which the differential device operates as a speed increase transmission whose speed ratio is smaller than 1.

21. The control apparatus according to claim 15, wherein the differential device comprises a planetary gear set including a carrier, a sun gear, and a ring gear, and the first, second, and third elements of the differential device comprise the carrier, the sun gear, and the ring gear, respectively.

22. The control apparatus according to claim 21, wherein the planetary gear set comprises a single-pinion planetary gear set including a pinion.

23. The control apparatus according to claim 13, wherein the automatic speed change portion comprises a stepwise automatic transmission.

24. The control apparatus according to claim 1, wherein the vehicle-stabilization-related switching controller switches, when the vehicle behavior stabilization controller performs the vehicle behavior stabilization control, the coupling device to a partly engaged, slipping state thereof as the released state thereof.

25. The control apparatus according to claim 1, further comprising a motor controller which controls the first motor and the second motor to produce no torques or substantially no torques.

26. The control apparatus according to claim 2, further comprising a motor controller which controls the first motor and the second motor to produce no torques or substantially no torques.

27. The control apparatus according to claim 1, wherein the vehicle behavior stabilization controller comprises at least one of a vehicle stability control (VSC) system and an antilock brake system (ABS).

28. The control apparatus according to claim 2, wherein the vehicle behavior stabilization controller comprises at least one of a vehicle stability control (VSC) system and an antilock brake system (ABS).

* * * * *